(12) United States Patent
Cowger et al.

(10) Patent No.: US 6,314,477 B1
(45) Date of Patent: Nov. 6, 2001

(54) PERFORMANCE OF FIBRE CHANNEL PROTOCOL SEQUENCE REASSEMBLY USING EXPECTED FRAME INFORMATION AND BUFFER LIST CALCULATIONS

(75) Inventors: Bryan J Cowger, Roseville; Brandon H Mathew, Auburn; Matthew P Wakeley, Roseville; Joseph H Steinmetz, Rocklin, all of CA (US)

(73) Assignee: Agilent Technologies, Inc.

( * ) Notice: Subject to any disclaimer, the term of this patent is extended or adjusted under 35 U.S.C. 154(b) by 0 days.

(21) Appl. No.: 09/183,865

(22) Filed: Oct. 30, 1998

(51) Int. Cl.$^7$ .................................................. G06F 13/14
(52) U.S. Cl. ............................ 710/22; 710/52; 709/236; 370/394
(58) Field of Search ................................ 710/22, 23, 52; 709/236; 370/394

(56) References Cited

U.S. PATENT DOCUMENTS

| | | | |
|---|---|---|---|
| 5,442,631 | * | 8/1995 | Tanaka et al. .................... 370/463 |
| 5,490,152 | * | 2/1996 | Gregg et al. ...................... 714/748 |
| 5,588,000 | * | 12/1996 | Rickard ............................ 370/428 |
| 5,590,122 | * | 12/1996 | Sandorfi et al. .................. 370/394 |
| 5,598,541 | * | 1/1997 | Malladi ............................ 710/106 |
| 5,621,464 | * | 4/1997 | Teo et al. ......................... 348/390 |
| 5,768,530 | * | 6/1998 | Sandorfi ........................... 709/233 |
| 5,828,901 | * | 10/1998 | O'Toole et al. ................... 710/22 |
| 5,872,822 | * | 2/1999 | Bennett ............................ 375/372 |
| 5,878,229 | * | 3/1999 | Bass et al. ........................ 709/236 |
| 5,933,654 | * | 8/1999 | Galdun et al. .................... 395/843 |
| 5,991,817 | * | 11/1999 | Rowett et al. .................... 709/250 |
| 6,014,383 | * | 1/2000 | McCarty ........................... 370/453 |
| 6,038,235 | * | 3/2000 | Ho et al. .......................... 370/462 |
| 6,052,387 | * | 4/2000 | Chow et al. ...................... 370/474 |
| 6,147,996 | * | 11/2000 | Laor et al. ........................ 370/394 |
| 6,175,902 | * | 1/2001 | Runaldue et al. ................ 711/159 |

* cited by examiner

*Primary Examiner*—Thomas Lee
*Assistant Examiner*—Abdelmoniem Elamin

(57) ABSTRACT

A method and system, implemented in hardware, for quickly and efficiently reassembling Fibre Channel data sequence data received by a Fibre Channel port in host memory buffers. The host memory buffers are referenced by a transaction status block allocated and initialized by the host. The transaction status block is referenced by the Fibre Channel port during transfer of data received in each Fibre Channel data frame of the Fibre Channel data sequence. The host memory buffers may be or arbitrary size and need only be byte aligned. The host computer can specify any number of host memory buffers by appropriate initialization of the transaction status block.

16 Claims, 31 Drawing Sheets

| INITIATOR | | | TARGET |
|---|---|---|---|
| STATE | EVENTS | EVENTS | STATE |
| BUS FREE _614_ | | | BUS FREE |
| ARBITRATION _616_ | ASSERT BSY AND D7 ASSERT SEL | | ARBITRATION |
| SELECTION _618_ | ASSERT DX AND ATN | | SELECTION |
| SELECTION _620_ | DROP BSY DROP SEL | ASSERT BSY | SELECTION |
| MESSAGE OUT _622_ | IDENTIFY — DISCONNECT PRIVILEGE _625_ \| LUN _623_ → _624_ | | MESSAGE OUT |
| MESSAGE OUT | QUEUE TAG MESSAGE — SIMPLE QUEUE TAG \| QUEUE TAG _626_ → _627_ | | MESSAGE OUT |
| COMMAND _628_ | READ OR WRITE — _630_ OPCODE (READ OR WRITE) _632_ / FLAGS / LOGICAL BLOCK NO. _636_ / DATA LENGTH _638_ → | | COMMAND |
| MESSAGE IN _640_ | DISCONNECT _642_ ← | | MESSAGE IN |
| BUS FREE _644_ | | DROP BSY | BUS FREE |

| INITIATOR | | TARGET | |
|---|---|---|---|
| STATE | | | STATE |
| BUS FREE 646 | | | BUS FREE |
| ARBITRATION 648 | | ASSERT BSY AND DX ASSERT SEL AND I/O | ARBITRATION |
| RESELECTION 650 | | ASSERT DX AND ATN DROP SEL | RESELECTION |
| MESSAGE IN 652 | | IDENTIFY LUN ~654 | MESSAGE IN |
| MESSAGE IN | | QUEUE TAG MESSAGE SIMPLE QUEUE TAG / QUEUE TAG ~656 | MESSAGE IN |
| DATA IN (read) OUT (write) 658 | ACK DATA REQ ... WRITE → ← READ | | DATA IN (read) OUT (write) |
| OPTIONAL DISCONNECT/ RECONNECT 660 | MESSAGE IN | SAVE POINTERS | MESSAGE IN |
| | MESSAGE IN | DISCONNECT | MESSAGE IN |
| | BUS FREE | | BUS FREE |
| | ARBITRATION | | ARBITRATION |
| | RESELECTION | | RESELECTION |
| | MESSAGE IN | IDENTIFY | MESSAGE IN |
| | MESSAGE IN | QUEUE TAG MESSAGE | MESSAGE IN |
| DATA | ACK DATA REQ ... WRITE → ← READ | | DATA |
| MESSAGE IN 662 | | DISCONNECT | MESSAGE IN |
| BUS FREE 664 | | DROP BSY | BUS FREE |

*Fig. 6B*

| INITIATOR | | TARGET |
|---|---|---|
| state | | state |
| BUS FREE 666 | | BUS FREE |
| ARBITRATION 668 | ASSERT BSY AND DX ASSERT SEL AND I/O | ARBITRATION |
| RESELECTION 670 | ASSERT DX AND ATN DROP SEL | RESELECTION |
| MESSAGE IN 672 | IDENTIFY<br>\| LUN \| ~674 | MESSAGE IN |
| MESSAGE IN | QUEUE TAG MESSAGE<br>\| SIMPLE QUEUE TAG \| QUEUE TAG \| ~676 | MESSAGE IN |
| STATUS 678 | \| 00h \| ~680 | STATUS |
| MESSAGE IN 682 | COMMAND COMPLETE<br>\| 00h \| ~684 | MESSAGE IN |
| BUS FREE 686 | DROP BSY | BUS FREE |

*Fig. 6C*

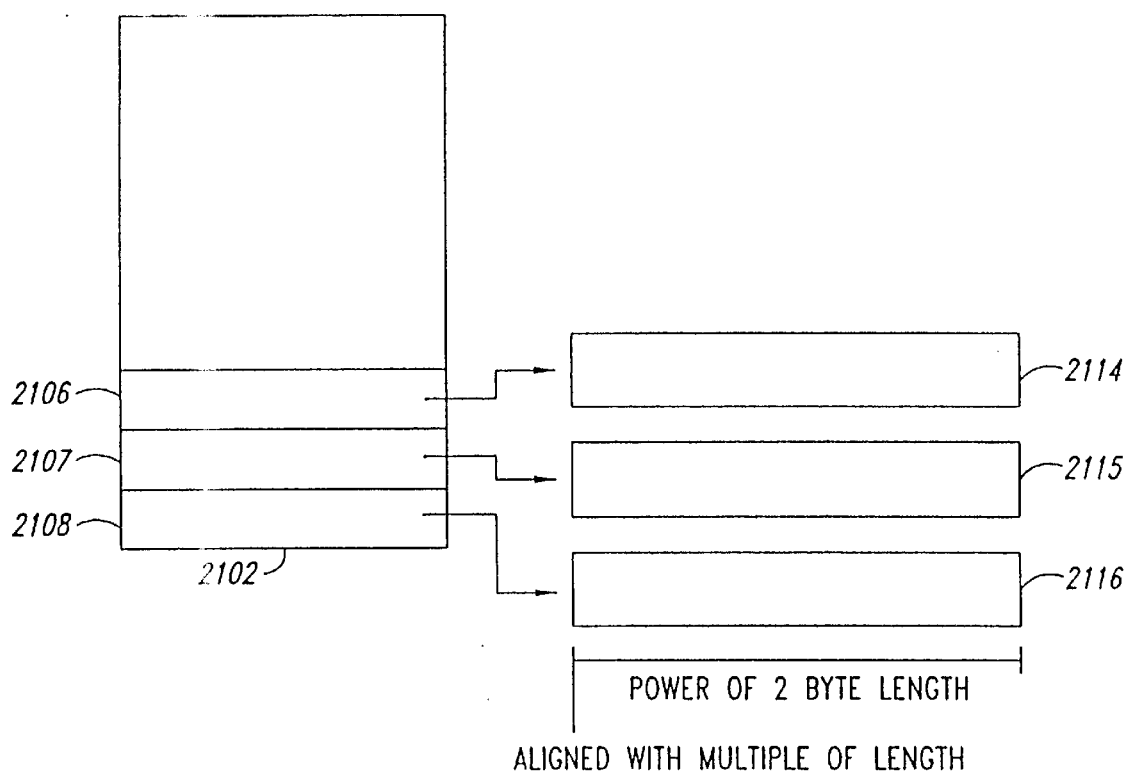
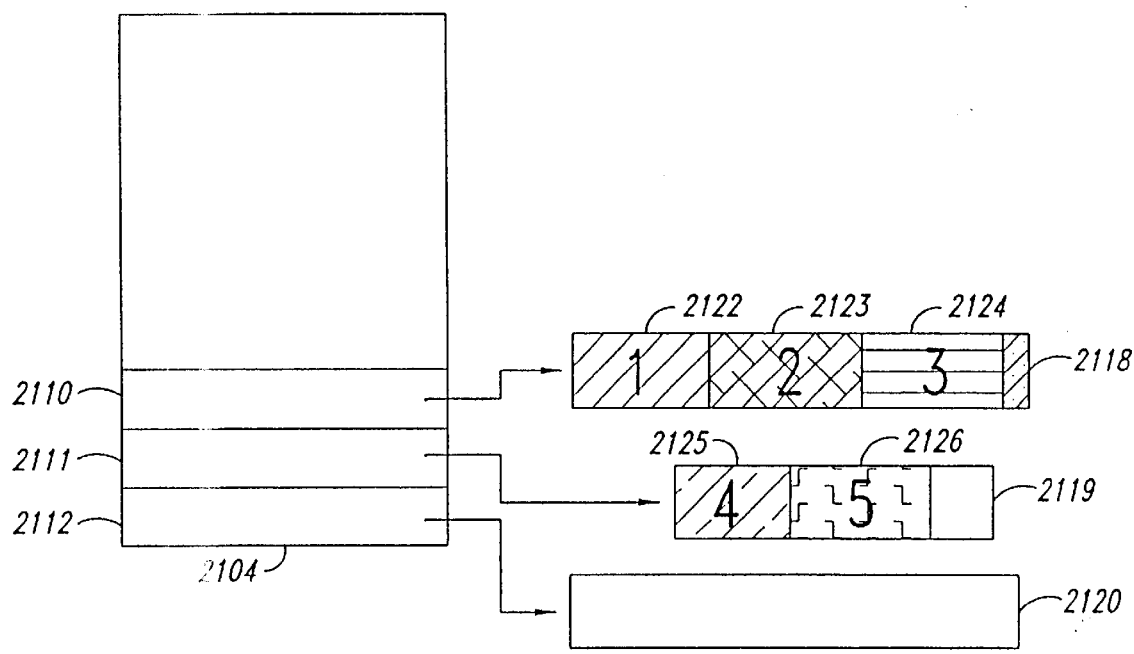
Fig. 21

PERFORMANCE OF FIBRE CHANNEL PROTOCOL SEQUENCE REASSEMBLY USING EXPECTED FRAME INFORMATION AND BUFFER LIST CALCULATIONS

TECHNICAL FIELD

The present invention relates to the reception of Fibre Channel frames by a Fibre Channel port, and, in particular, to a hardware implementation of an interface controller within a Fibre Channel port for quickly and efficiently locating the position in host memory into which to place the data contained in each received Fibre Channel frame.

BACKGROUND OF THE INVENTION

The Fibre Channel ("FC") is an architecture and protocol for a data communication network that interconnects a number of different combinations of computers and peripheral devices. The FC supports a variety of upper-level protocols, including the small computer systems interface ("SCSI") protocol. A computer or peripheral device is linked to the network through an FC Port and copper wires or optical fibers. An FC Port includes a transceiver and an interface controller, and the computer peripheral device in which the FC Port is contained is called a "host." The FC Port exchanges data with the host via a local data bus, such as a peripheral computer interface ("PCI") bus. The interface controller conducts lower-level protocol exchanges between the Fibre Channel and the computer or peripheral device in which the FC Port resides.

A high-level Fibre Channel transaction involves the exchange between FC Ports of one or more FC sequences. An FC sequence is, in turn, composed of one or more sequentially ordered FC frames. As an FC Port receives the FC frames comprising an FC data sequence, the FC Port extracts the data from each FC frame and places the data into host memory. The host memory into which the data is placed may be composed of one or more host memory buffers. These host memory buffers may not be contiguous in memory. However, the data received for an FC data sequence must be organized within these memory buffers sequentially, starting from the first byte of the first data frame of the sequence and proceeding to the final byte of the final data frame of the sequence. The header of each FC data frame contains a relative offset field that indicates the relative offset of the data contained in that data frame from within the entire FC data sequence in which the data frame is contained. Upon receipt of an FC data frame, an FC Port must either be able to quickly calculate where to place the data contained in that data frame into one or more memory buffers via one or more direct memory access ("DMA") operations, or must instead pass the received data and relative offset of the received data to the host so that the host can make the calculations and move the data into the data buffers. The latter alternative incurs redundant data copying and is impracticably slow and host processor-intensive in the high-band width and high-speed Fibre Channel communications network.

Currently available and previously available FC Ports achieved the required efficiency and speed in reassembling received data into host memory buffers by placing restrictions on the size and alignment of the host memory buffers, or by requiring that all FC data frames of an FC data sequence be received in order. In certain FC topologies, in-order data frame reception is more or less guaranteed; however, in other FC topologies in-order FC frame reception is not guaranteed. Furthermore, it is difficult, under many computer operating systems, for a host computer to acquire correctly aligned memory buffer of specific sizes. Thus, the restrictions required by currently available and previously available FC Ports for reassembling FC data sequence data in host memory make it impractical or impossible for FC Ports to function in many environments. A need has therefore been recognized by FC Port designers and manufacturers for a method to implement, in hardware within an FC Port, quick and efficient reassembling of FC data sequence data, some of which may be received out of order, into byte-aligned host memory buffers of arbitrary sizes.

SUMMARY OF THE INVENTION

The present invention provides a Fibre Channel ("FC") interface controller that implements, in hardware, an efficient method for reassembling the data contained in FC data frames into arbitrarily-sized and byte-aligned host memory buffers. The host computer allocates and initializes a transaction status block ("TSB") to contain various information required by an FC Port to carry out a Fibre Channel protocol ("FCP") transaction. The TSB may contain the length and addresses of three host memory buffers, or may contain a pointer to auxiliary data structures that contain a number of length and address pairs describing host memory buffers. The TSB is initialized by the host to contain information about the next expected FC data frame and the location in the host memory buffers into which the FC Port needs to place the data contained in the next expected FC data frame. If a data frame is received by an FC Port out of order with respect to the FC data sequence in which the FC data frame is contained, the FC Port can nonetheless determine a position within the host memory buffers to place the data contained in that data frame. The FC port subsequently and automatically maintains the information about the next expected FC data frame.

BRIEF DESCRIPTION OF THE DRAWINGS

FIGS. 6A–6C illustrate the SCSI protocol involved in the initiation and implementation of read and write I/O operations.

FIG. 21 shows generalized TSBs employed by currently available and previously available FC Ports.

DETAILED DESCRIPTION OF THE INVENTION

Figure 1A:
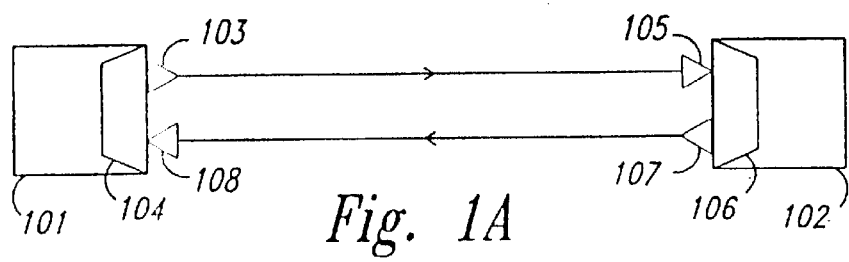
FIGS. 1A–1C shows the three different types of FC interconnection topologies.

The present invention will be described below in six subsections. The first three subsections provide greater detail about the Fibre Channel architecture and protocol, the SCSI architecture and protocol, and implementation of the SCSI protocol on top of the Fibre Channel protocol. The fourth subsection discusses the Fibre Channel arbitrated loop intialization process. The fifth subsection provides a general description of the present invention, and the sixth subsection provides a detailed pseudo-code implementation of the present invention.

Fibre Channel

The Fibre Channel ("FC") is defined by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

The FC is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC Port and FC link. An FC Port is an FC host adapter or FC controller that shares a register and memory interface with the processing components of the FC node, and that implements, in hardware and firmware, the lower levels of the FC protocol. The FC node generally exchanges data and control information with the FC Port using shared data structures in shared memory and using control registers in the FC Port. The FC Port includes serial transmitter and receiver components coupled to a communications medium via a link that comprises electrical wires or optical strands.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

Figure 1B:
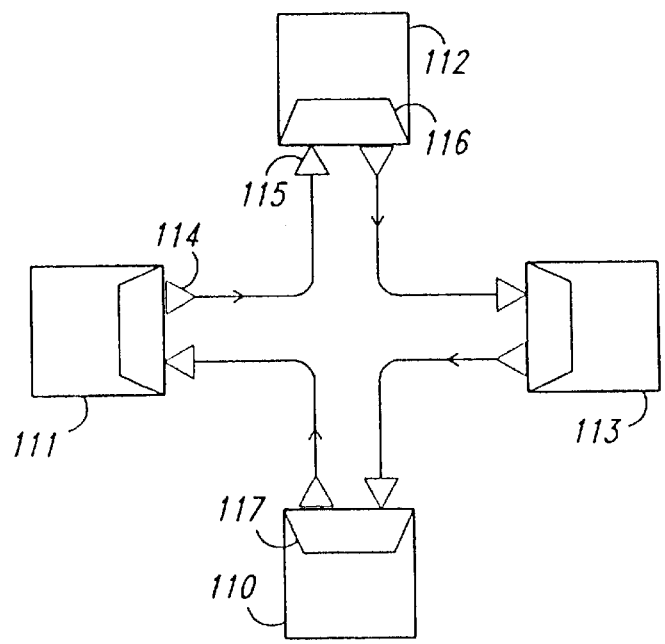
Figure 1C:
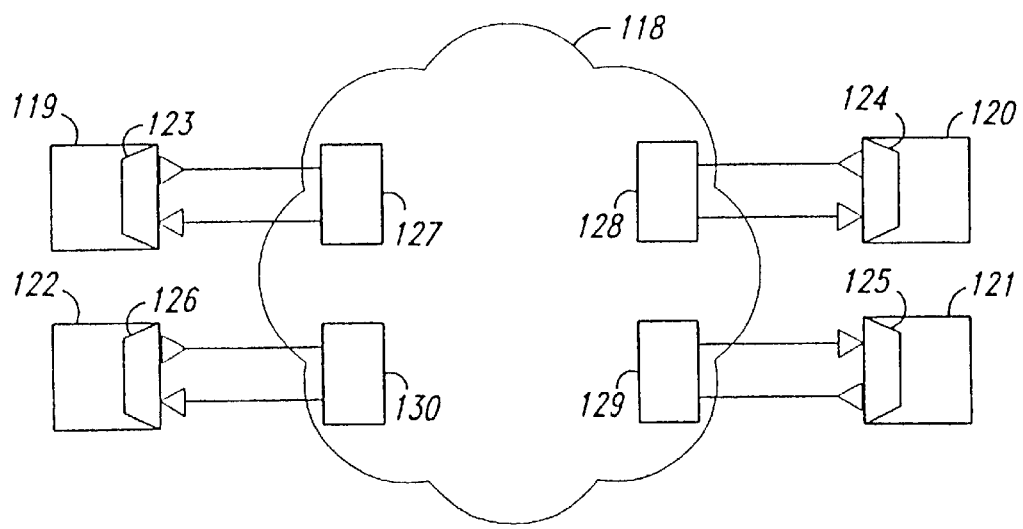

The PC architecture and protocol support three different types of interconnection topologies, shown in FIGS. 1A–1C. FIG. 1A shows the simplest of the three interconnected topologies, called the "point-to-point topology." In the point-to-point topology shown in FIG. 1A, a first node 101 is directly connected to a second node 102 by directly coupling the transmitter 103 of the PC Port 104 of the first node 101 to the receiver 105 of the FC Port 106 of the second node 102, and by directly connecting the transmitter 107 of the FC Port 106 of the second node 102 to the receiver 108 of the FC Port 104 of the first node 101. The ports 104 and 106 used in the point-to-point topology are called N_Ports.

FIG. 1B shows a somewhat more complex topology called the "FC arbitrated loop topology." FIG. 1B shows four nodes 110–113 interconnected within an arbitrated loop. Signals, consisting of electrical or optical binary data, are transferred from one node to the next node around the loop in a circular fashion. The transmitter of one node, such as transmitter 114 associated with node 111, is directly connected to the receiver of the next node in the loop, in the case of transmitter 114, with the receiver 115 associated with node 112. Two types of FC Ports may be used to interconnect FC nodes within an arbitrated loop. The most common type of port used in arbitrated loops is called the "NL_Port." A special type of port, called the "FL_Port," may be used to interconnect an FC arbitrated loop with an FC fabric topology, to be described below. Only one FL_Port may be actively incorporated into an arbitrated loop topology. An FC arbitrated loop topology may include up to 127 active FC ports, and may include additional non-participating FC ports.

In the FC arbitrated loop topology, nodes contend for, or arbitrate for, control of the arbitrated loop. In general, the node with the lowest port address obtains control in the case that more than one node is contending for control. A fairness algorithm may be implemented by nodes to ensure that all nodes eventually receive control within a reasonable amount of time. When a node has acquired control of the loop, the node can open a channel to any other node within the arbitrated loop. In a half duplex channel, one node transmits and the other node receives data. In a full duplex channel, data may be transmitted by a first node and received by a second node at the same time that data is transmitted by the second node and received by the first node. For example, if, in the arbitrated loop of FIG. 1B, node 111 opens a full duplex channel with node 113, then data transmitted through that channel from node 111 to node 113 passes through NL_Port 116 of node 112, and data transmitted by node 113 to node 111 passes through NL_Port 117 of node 110.

FIG. 1C shows the most general and most complex FC topology, called an "FC fabric." The PC fabric is represented in FIG. 1C by the irregularly shaped central object 118 to which four FC nodes 119–122 are connected. The N_Ports 123–126 within the FC nodes 119–122 are connected to F_Ports 127–130 within the fabric 118. The fabric is a switched or cross-point switch topology similar in function to a telephone system. Data is routed by the fabric between F_Ports through switches or exchanges called "fabric elements." There may be many possible routes through the fabric between one F_Port and another F_Port. The routing of data and the addressing of nodes within the fabric associated with F_Ports are handled by the FC fabric, rather than by FC nodes or N_Ports.

When optical fibers are employed, a single FC fabric can extend for ten kilometers. The FC can support interconnection of more than 16,000,000 FC nodes. A single FC host adapter can transmit and receive data at rates of up to 200 Mbytes per second. Much higher data exchange rates are planned for FC components in the near future.

Figure 2:
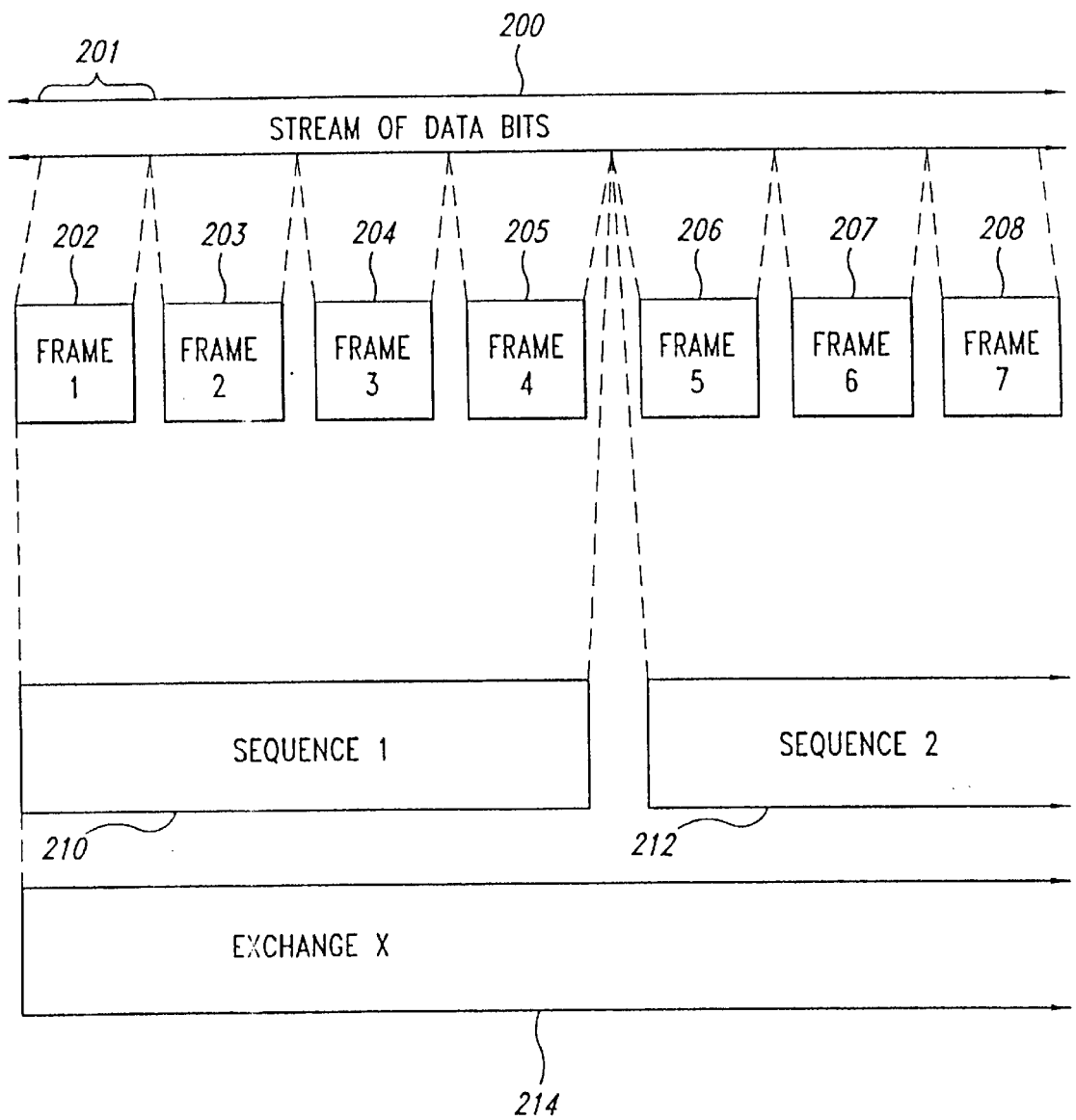
FIG. 2 illustrates a very simple hierarchy by which data is organized, in time, for transfer through an FC network.

The FC is a serial communications medium. Data is transferred one bit at a time at extremely high transfer rates. FIG. 2 illustrates a very simple hierarchy by which data is organized, in time, for transfer through an FC network. At the lowest conceptual level, the data can be considered to be a stream of data bits 200. The smallest unit of data, or grouping of data bits, supported by an FC network is a 10-bit character that is decoded by FC port as an 8-bit character. FC primitives are composed of 10-bit characters or bytes. Certain FC primitives are employed to carry control information exchanged between FC ports. The next level of data organization, a fundamental level with regard to the FC protocol, is a frame. Seven frames 202–208 are shown in FIG. 2. A frame may be composed of between 36 and 2,148 bytes of data, depending on the nature of the data included in the frame. The first FC frame, for example, corresponds to the data bits of the stream of data bits 200 encompassed by the horizontal bracket 201. The FC protocol specifies a next higher organizational level called the sequence. A first sequence 210 and a portion of a second sequence 212 are displayed in FIG. 2. The first sequence 210 is composed of frames one through four 202–205. The second sequence 212 is composed of frames five through seven 206–208 and additional frames that are not shown. The FC protocol specifies a third organizational level called the exchange. A portion of an exchange 214 is shown in FIG. 2. This exchange 214 is composed of at least the first sequence 210 and the second sequence 212 shown in FIG. 2. This exchange can alternatively be viewed as being composed of frames one through seven 202–208, and any additional frames contained in the second sequence 212 and in any additional sequences that compose the exchange 214.

The FC is a full duplex data transmission medium. Frames and sequences can be simultaneously passed in both directions between an originator, or initiator, and a responder, or target. An exchange comprises all sequences, and frames within the sequences, exchanged between an originator and a responder during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The SCSI bus architecture will be discussed in the following subsection, and much of the subsequent discussion in this and remaining subsections will focus on the SCSI protocol embedded within the FC protocol. The standard adaptation of SCSE protocol to Fibre Channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC.

Figure 3:
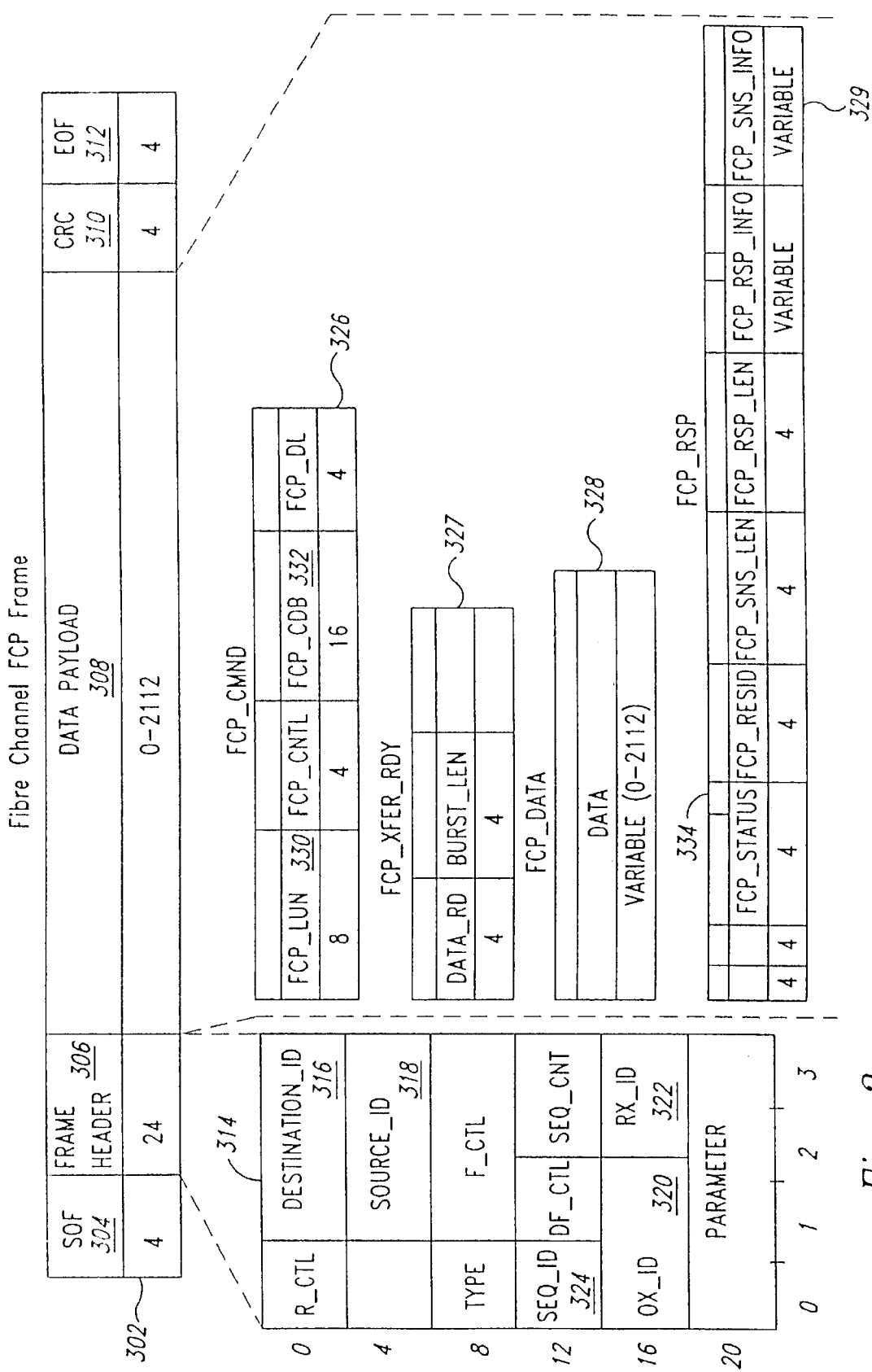
FIG. 3 shows the contents of a standard FC frame.

FIG. 3 shows the contents of a standard FC frame. The FC frame 302 comprises five high level sections 304, 306, 308, 310 and 312. The first high level section, called the start-of-frame deliminator 304, comprises 4 bytes that mark the beginning of the frame. The next high level section, called frame header 306, comprises 24 bytes that contain addressing information, sequence information, exchange information, and various control flags. A more detailed view of the frame header 314 is shown expanded from the FC frame 302 in FIG. 3. The destination identifier ("D_ID"), or DESTINATION_ID 316, is a 24-bit FC address indicating the destination FC Port for the frame. The source identifier ("S_ID"), or SOURCE_ID 318, is a 24-bit address that indicates the FC Port that transmitted the frame. The originator ID, or OX_ID 320, and the responder ID 322, or RX_ID, together compose a 32-bit exchange ID that identifies the exchange to which the frame belongs with respect to the originator, or initiator, and responder, or target, FC Ports. The sequence ID, or SEQ_ID, 324 identifies the sequence to which the frame belongs.

The next high level section 308, called the data payload, contains the actual data packaged within the FC frame. The data payload contains data and encapsulating protocol information that is being transferred according to a higher-level protocol, such as IP and SCSI. FIG. 3 shows four basic types of data payload layouts 326–329 used for data transfer according to the SCSI protocol. The first of these formats 326, called the FCP_CMND, is used to send a SCSI command from an initiator to a target. The FCP_LUN field 330 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 330 contains an index or reference number that can be used by the target FC host adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 332.

The second type of data payload format 327 shown in FIG. 3 is called the FCP_XFER_RDY layout. This data payload format is used to transfer a SCSI proceed command from the target to the initiator when the target is prepared to begin receiving or sending data. The third type of data payload format 328 shown in FIG. 3 is the FCP_DATA format, used for transferring the actual data that is being read or written as a result of execution of a SCSI I/O transaction. The final data payload format 329 shown in FIG. 3 is called the FCP_RSP layout, used to transfer a SCSI status byte 334, as well as other FCP status information, from the target back to the initiator upon completion of the I/O transaction.

The SCSI Bus Architecture

A computer bus is a set of electrical signal lines through which computer commands and data are transmitted between processing, storage, and input/output ("I/O") components of a computer system. The SCSI I/O bus is the most widespread and popular computer bus for interconnecting mass storage devices, such as hard disks and CD-ROM drives, with the memory and processing components of computer systems. The SCSI bus architecture is defined in three major standards: SCSI-1, SCSI-2 and SCSI-3. The SCSI-1 and SCSI-2 standards are published in the American National Standards Institute ("ANSI") standards documents "X3.131-1986," and "X3.131-1994," respectively. The SCSI-3 standard is currently being developed by an ANSI committee. An overview of the SCSI bus architecture is provided by "The SCSI Bus and IDE Interface," Freidhelm Schmidt, Addison-Wesley Publishing Company, ISBN 0-201-17514-2, 1997 ("Schmidt").

Figure 4:
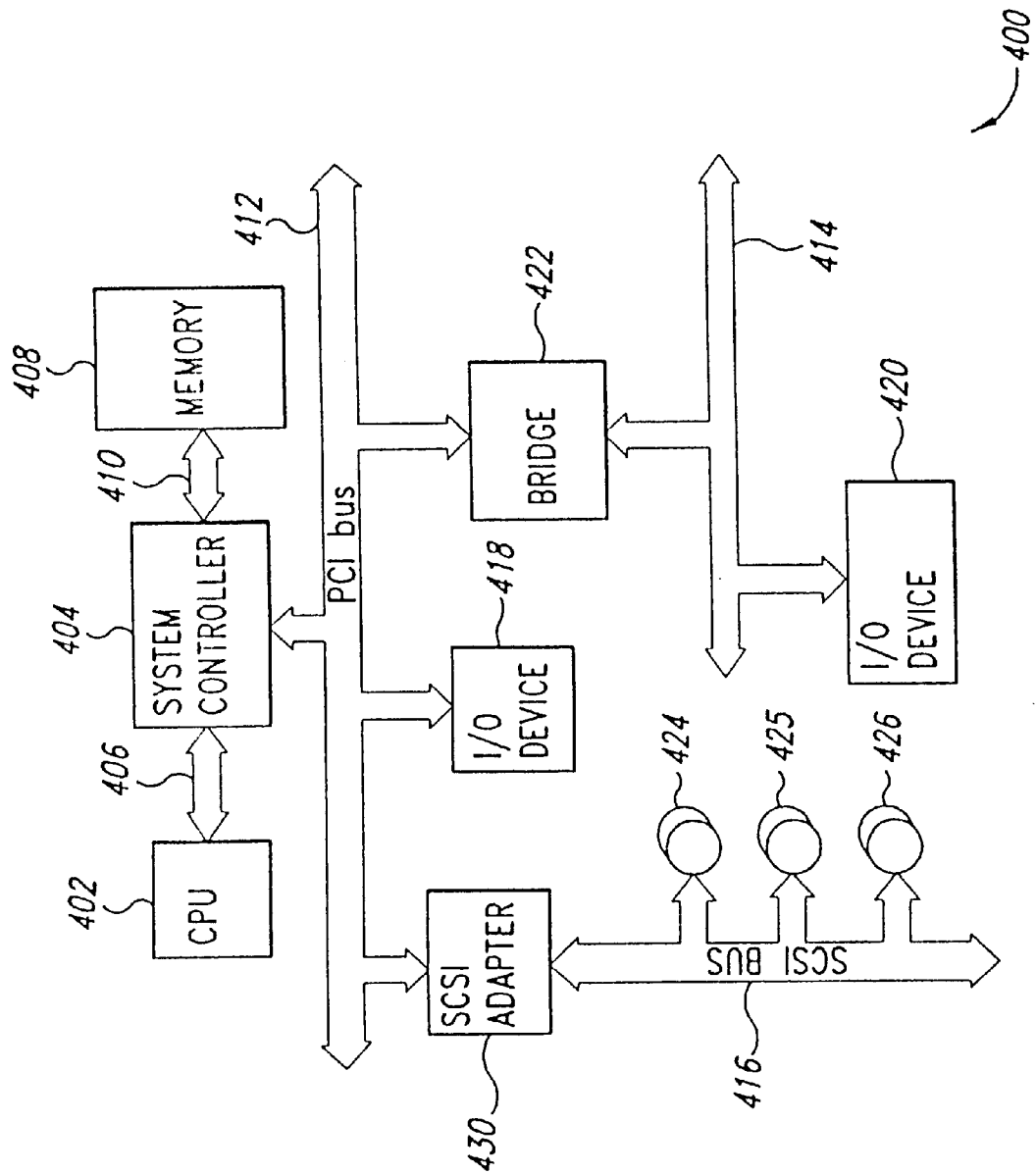
FIG. 4 is a block diagram of a common personal computer architecture including a SCSI bus.

FIG. 4 is a block diagram of a common personal computer ("PC") architecture including a SCSI bus. The PC 400 includes a central processing unit, or processor ("CPU") 402, linked to a system controller 404 by a high-speed CPU bus 406. The system controller is, in turn, linked to a system memory component 408 via a memory bus 410. The system controller 404 is, in addition, linked to various peripheral devices via a peripheral component interconnect ("PCI") bus 412 that is interconnected with a slower industry standard architecture ("ISA") bus 414 and a SCSI bus 416. The architecture of the PCI bus is described in "PCI System Architecture," Shanley & Anderson, Mine Share, Inc., Addison-Wesley Publishing Company, ISBN 0-201-40993-3, 1995. The interconnected CPU bus 406, memory bus 410, PCI bus 412, and ISA bus 414 allow the CPU to exchange data and commands with the various processing and memory components and I/O devices included in the computer system. Generally, very high-speed and high bandwidth I/O devices, such as a video display device 418, are directly connected to the PCI bus. Slow I/O devices 420, such as a keyboard 420 and a pointing device (not shown), are connected directly to the ISA bus 414. The ISA bus is interconnected with the PCI bus through a bus bridge component 422. Mass storage devices, such as hard disks, floppy disk drives, CD-ROM drives, and tape drives 424–426 are connected to the SCSI bus 416. The SCSI bus is interconnected with the PCI bus 412 via a SCSI-bus adapter 430. The SCSI-bus adapter 430 includes a processor component, such as processor selected from the Symbios family of 53C8xx SCSI processors, and interfaces to the PCI bus 412 using standard PCI bus protocols. The SCSI-bus adapter 430 interfaces to the SCSI bus 416 using the SCSI bus protocol that will be described, in part, below. The SCSI-bus adapter 430 exchanges commands and data with SCSI controllers (not shown) that are generally embedded within each mass storage device 424–426, or SCSI device, connected to the SCSI bus. The SCSI controller is a hardware/firmware component that interprets and responds to SCSI commands received from a SCSI adapter via the SCSI bus and that implements the SCSI commands by interfacing with, and controlling, logical devices. A logical device may correspond to one or more physical devices, or to portions of one or more physical devices. Physical devices include data storage devices such as disk, tape and CD-ROM drives.

Two important types of commands, called I/O commands, direct the SCSI device to read data from a logical device and write data to a logical device. An I/O transaction is the exchange of data between two components of the computer system, generally initiated by a processing component, such as the CPU 402, that is implemented, in part, by a read I/O command or by a write I/O command. Thus, I/O transactions include read I/O transactions and write I/O transactions.

The SCSI bus 416 is a parallel bus that can simultaneously transport a number of data bits. The number of data bits that can be simultaneously transported by the SCSI bus is referred to as the width of the bus. Different types of SCSI buses have widths of 8, 16 and 32 bits. The 16 and 32-bit SCSI buses are referred to as wide SCSI buses.

As with all computer buses and processors, the SCSI bus is controlled by a clock that determines the speed of operations and data transfer on the bus. SCSI buses vary in clock speed. The combination of the width of a SCSI bus and the clock rate at which the SCSI bus operates determines the number of bytes that can be transported through the SCSI bus per second, or bandwidth of the SCSI bus. Different types of SCSI buses have bandwidths ranging from less than 2 megabytes ("Mbytes") per second up to 40 Mbytes per second, with increases to 80 Mbytes per second and possibly 160 Mbytes per second planned for the future. The increasing bandwidths may be accompanied by increasing limitations in the physical length of the SCSI bus.

Figure 5:
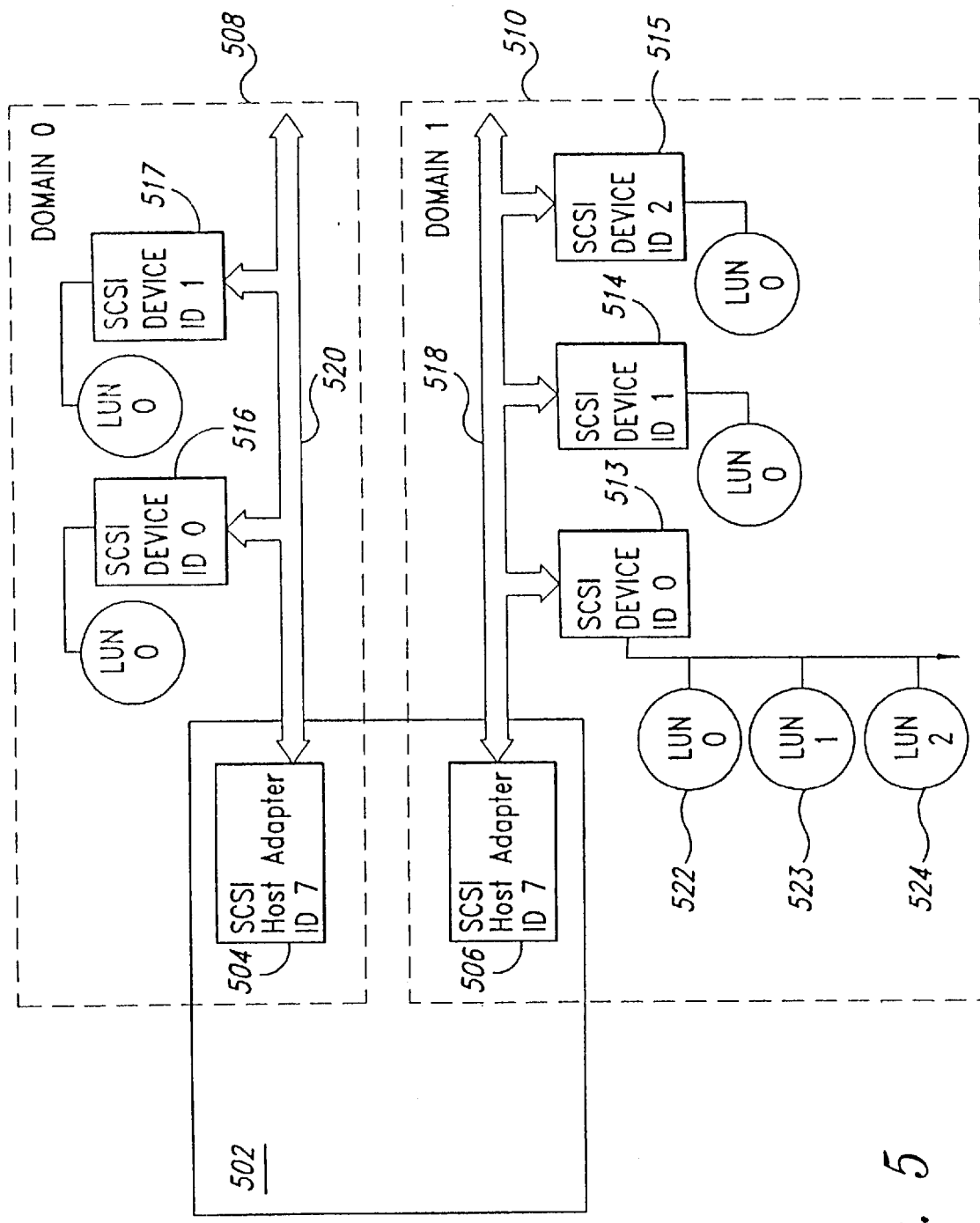
FIG. 5 illustrates the SCSI bus topology.

FIG. 5 illustrates the SCSI bus topology. A computer system 502, or other hardware system, may include one or more SCSI-bus adapters 504 and 506. The SCSI-bus adapter, the SCSI bus which the SCSI-bus adapter controls, and any peripheral devices attached to that SCSI bus together comprise a domain. SCSI-bus adapter 504 in FIG. 5 is associated with a first domain 508 and SCSI-bus adapter 506 is associated with a second domain 510. The most current SCSI-2 bus implementation allows fifteen different SCSI devices 513–515 and 516–517 to be attached to a single SCSI bus. In FIG. 5, SCSI devices 513–515 are attached to SCSI bus 518 controlled by SCSI-bus adapter 506, and SCSI devices 516–517 are attached to SCSI bus 520 controlled by SCSI-bus adapter 504. Each SCSI-bus adapter and SCSI device has a SCSI identification number, or SCSI_ID, that uniquely identifies the device or adapter in a particular SCSI bus. By convention, the SCSI-bus adapter has SCSI_ID 7, and the SCSI devices attached to the SCSI bus have SCSI_IDs ranging from 0 to 6 and from 8 to 15. A SCSI device, such as SCSI device 513, may interface with a number of logical devices, each logical device comprising portions of one or more physical devices. Each logical device is identified by a logical unit number ("LUN") that uniquely identifies the logical device with respect to the SCSI device that controls the logical device. For example, SCSI device 513 controls logical devices 522–524 having LUNs 0, 1, and 2, respectively. According to SCSI terminology, a device that initiates an I/O command on the SCSI bus is called an initiator, and a SCSI device that receives an I/O command over the SCSI bus that directs the SCSI device to execute an I/O operation is called a target.

In general, a SCSI-bus adapter, such as SCSI-bus adapters 504 and 506, initiates I/O operations by sending commands to target devices. The target devices 513–515 and 516–517 receive the I/O commands from the SCSI bus. The target devices 513–515 and 516–517 then implement the commands by interfacing with one or more logical devices that they control to either read data from the logical devices and return the data through the SCSI bus to the initiator or to write data received through the SCSI bus from the initiator to the logical devices. Finally, the target devices 513–515 and 516–517 respond to the initiator through the SCSI bus with status messages that indicate the success or failure of implementation of the commands.

FIGS. 6A–6C illustrate the SCSI protocol involved in the initiation and implementation of read and write I/O operations. Read and write I/O operations compose the bulk of I/O operations performed by SCSI devices. Efforts to maximize the efficiency of operation of a system of mass storage devices interconnected by a SCSI bus are most commonly directed toward maximizing the efficiency at which read and write I/O operations are performed. Thus, in the discussions to follow, the architectural features of various hardware devices will be discussed in terms of read and write operations.

FIG. 6A shows the sending of a read or write I/O command by a SCSI initiator, most commonly a SCSI-bus adapter, to a SCSI target, most commonly a SCSI controller embedded in a SCSI device associated with one or more logical devices. The sending of a read or write I/O command is called the command phase of a SCSI I/O operation. FIG. 6A is divided into initiator 602 and target 604 sections by a central vertical line 606. Both the initiator and the target sections include columns entitled "state" 606 and 608 that describe the state of the SCSI bus and columns entitled "events" 610 and 612 that describe the SCSI bus events associated with the initiator and the target, respectively. The bus states and bus events involved in the sending of the I/O command are ordered in time, descending from the top of FIG. 6A to the bottom of FIG. 6A. FIGS. 6B–6C also adhere to this above-described format.

The sending of an I/O command from an initiator SCSI-bus adapter to a target SCSI device, illustrated in FIG. 6A, initiates a read or write I/O operation by the target SCSI device. Referring to FIG. 4, the SCSI-bus adapter 430 initiates the I/O operation as part of an I/O transaction. Generally, the SCSI-bus adapter 430 receives a read or write command via the PCI bus 412, system controller 404, and CPU bus 406, from the CPU 402 directing the SCSI-bus adapter to perform either a read operation or a write operation. In a read operation, the CPU 402 directs the SCSI-bus adapter 430 to read data from a mass storage device 424–426 and transfer that data via the SCSI bus 416, PCI bus 412, system controller 404, and memory bus 410 to a location within the system memory 408. In a write operation, the CPU 402 directs the system controller 404 to transfer data from the system memory 408 via the memory bus 410, system controller 404, and PCI bus 412 to the SCSI-bus adapter 430, and directs the SCSI-bus adapter 430 to send the data via the SCSI bus 416 to a mass storage device 424–426 on which the data is written.

FIG. 6A starts with the SCSI bus in the BUS FREE state 614, indicating that there are no commands or data currently being transported on the SCSI device. The initiator, or SCSI-bus adapter, asserts the BSY, D7 and SEL signal lines of the SCSI bus in order to cause the bus to enter the ARBITRATION state 616. In this state, the initiator announces to all of the devices an intent to transmit a command on the SCSI bus. Arbitration is necessary because only one device may control operation of the SCSI bus at any instant in time. Assuming that the initiator gains control of the SCSI bus, the initiator then asserts the ATN signal line and the DX signal line corresponding to the target SCSI_ID in order to cause the SCSI bus to enter the SELECTION state 618. The initiator or target asserts and drops various SCSI signal lines in a particular sequence in order to effect a SCSI bus state change, such as the change of state from the ARBITRATION state 616 to the SELECTION state 618, described above. These sequences can be found in Schmidt and in the ANSI standards, and will therefore not be further described below.

When the target senses that the target has been selected by the initiator, the target assumes control 620 of the SCSI bus in order to complete the command phase of the I/O operation. The target then controls the SCSI signal lines in order to enter the MESSAGE OUT state 622. In a first event that occurs in the MESSAGE OUT state, the target receives from the initiator an IDENTIFY message 623. The IDENTIFY message 623 contains a LUN field 624 that identifies the LUN to which the command message that will follow is addressed. The IDENTIFY message 623 also contains a flag 625 that is generally set to indicate to the target that the target is authorized to disconnect from the SCSI bus during the target's implementation of the I/O command that will follow. The target then receives a QUEUE TAG message 626 that indicates to the target how the I/O command that will follow should be queued, as well as providing the target with a queue tag 627. The queue tag is a byte that identifies the I/O command. A SCSI-bus adapter can therefore concurrently manage 656 different I/O commands per LUN. The combination of the SCSI_ID of the initiator SCSI-bus adapter, the SCSI_ID of the target SCSI device, the target LUN, and the queue tag together comprise an I_T_L_Q nexus reference number that uniquely identifies the I/O operation corresponding to the I/O command that will follow within the SCSI bus. Next, the target device controls the SCSI bus signal lines in order to enter the COMMAND state 628. In the COMMAND state, the target solicits and receives from the initiator the I/O command 630. The I/O command 630 includes an opcode 632 that identifies the particular command to be executed, in this case a read command or a write command, a logical block number 636 that identifies the logical block of the logical device that will be the beginning point of the read or write operation specified by the command, and a data length 638 that specifies the number of blocks that will be read or written during execution of the command.

When the target has received and processed the I/O command, the target device controls the SCSI bus signal lines in order to enter the MESSAGE IN state 640 in which the target device generally sends a disconnect message 642 back to the initiator device. The target disconnects from the SCSI bus because, in general, the target will begin to interact with the logical device in order to prepare the logical device for the read or write operation specified by the command. The target may need to prepare buffers for receiving data, and, in the case of disk drives or CD-ROM drives, the target device may direct the logical device to seek to the appropriate block specified as the starting point for the read or write command. By disconnecting, the target device frees up the SCSI bus for transportation of additional messages, commands, or data between the SCSI-bus adapter and the target devices. In this way, a large number of different I/O operations can be concurrently multiplexed over the SCSI bus. Finally, the target device drops the BSY signal line in order to return the SCSI bus to the BUS FREE state 644.

The target device then prepares the logical device for the read or write operation. When the logical device is ready for reading or writing data, the data phase for the I/O operation ensues. FIG. 6B illustrates the data phase of a SCSI I/O operation. The SCSI bus is initially in the BUS FREE state 646. The target device, now ready to either return data in response to a read I/O command or accept data in response to a write I/O command, controls the SCSI bus signal lines in order to enter the ARBITRATION state 648. Assuming that the target device is successful in arbitrating for control of the SCSI bus, the target device controls the SCSI bus signal lines in order to enter the RESELECTION state 650. The RESELECTION state is similar to the SELECTION state, described in the above discussion of FIG. 6A, except that it is the target device that is making the selection of a SCSI-bus adapter with which to communicate in the RESELECTION state, rather than the SCSI-bus adapter selecting a target device in the SELECTION state.

Once the target device has selected the SCSI-bus adapter, the target device manipulates the SCSI bus signal lines in order to cause the SCSI bus to enter the MESSAGE IN state 652. In the MESSAGE IN state, the target device sends both an IDENTIFY message 654 and a QUEUE TAG message 656 to the SCSI-bus adapter. These messages are identical to the IDENTITY and QUEUE TAG messages sent by the initiator to the target device during transmission of the I/O command from the initiator to the target, illustrated in FIG. 6A. The initiator may use the I_T_L_Q nexus reference number, a combination of the SCSI_IDs of the initiator and target device, the target LUN, and the queue tag contained in the QUEUE TAG message, to identify the I/O transaction for which data will be subsequently sent from the target to the initiator, in the case of a read operation, or to which data will be subsequently transmitted by the initiator, in the case of a write operation. The I_T_L_Q nexus reference number is thus an I/O operation handle that can be used by the SCSI-bus adapter as an index into a table of outstanding I/O commands in order to locate the appropriate buffer for receiving data from the target device, in case of a read, or for transmitting data to the target device, in case of a write.

After sending the IDENTIFY and QUEUE TAG messages, the target device controls the SCSI signal lines in order to transition to a DATA state 658. In the case of a read I/O operation, the SCSI bus will transition to the DATA IN state. In the case of a write I/O operation, the SCSI bus will transition to a DATA OUT state. During the time that the SCSI bus is in the DATA state, the target device will transmit, during each SCSI bus clock cycle, a data unit having a size, in bits, equal to the width of the particular SCSI bus on which the data is being transmitted. In general, there is a SCSI bus signal line handshake involving the signal lines ACK and REQ as part of the transfer of each unit of data. In the case of a read I/O command, for example, the target device places the next data unit on the SCSI bus and asserts the REQ signal line. The initiator senses assertion of the REQ signal line, retrieves the transmitted data from the SCSI bus, and asserts the ACK signal line to acknowledge receipt of the data. This type of data transfer is called asynchronous transfer. The SCSI bus protocol also allows for the target device to transfer a certain number of data units prior to receiving the first acknowledgment from the initiator. In this transfer mode, called synchronous transfer, the latency between the sending of the first data unit and receipt of acknowledgment for that transmission is avoided. During data transmission, the target device can interrupt the data transmission by sending a SAVE POINTERS message followed by a DISCONNECT message to the initiator and then controlling the SCSI bus signal lines to enter the BUS FREE state. This allows the target device to pause in order to interact with the logical devices which the target device controls before receiving or transmitting further data. After disconnecting from the SCSI bus, the target device may then later again arbitrate for control of the SCSI bus and send additional IDENTIFY and QUEUE TAG messages to the initiator so that the initiator can resume data reception or transfer at the point that the initiator was interrupted. An example of disconnect and reconnect 660 are shown in FIG. 3B interrupting the DATA state 658. Finally, when all the data for the I/O operation has been transmitted, the target device controls the SCSI signal lines in order to enter the MESSAGE IN state 662, in which the target device sends a DISCONNECT message to the initiator, optionally preceded by a SAVE POINTERS message. After sending the DISCONNECT message, the target device drops the BSY signal line so the SCSI bus transitions to the BUS FREE state 664.

Following the transmission of the data for the I/O operation, as illustrated in FIG. 6B, the target device returns a status to the initiator during the status phase of the I/O operation. FIG. 6C illustrates the status phase of the I/O operation. As in FIGS. 6A–6B, the SCSI bus transitions from the BUS FREE state 666 to the ARBITRATION state 668, RESELECTION state 670, and MESSAGE IN state 672, as in FIG. 3B. Following transmission of an IDENTIFY message 674 and QUEUE TAG message 676 by the target to the initiator during the MESSAGE IN state 672, the target device controls the SCSI bus signal lines in order to enter the STATUS state 678. In the STATUS state 678, the target device sends a single status byte 684 to the initiator to indicate whether or not the I/O command was successfully completed. In FIG. 6C, the status byte 680 corresponding to a successful completion, indicated by a status code of 0, is shown being sent from the target device to the initiator. Following transmission of the status byte, the target device then controls the SCSI bus signal lines in order to enter the MESSAGE IN state 682, in which the target device sends a COMMAND COMPLETE message 684 to the initiator. At this point, the I/O operation has been completed. The target device then drops the BSY signal line so that the SCSI bus returns to the BUS FREE state 686. The SCSI-bus adapter can now finish its portion of the I/O command, free up any internal resources that were allocated in order to execute the command, and return a completion message or status back to the CPU via the PCI bus.

Mapping the SCSI Protocol onto FCP

Figure 7A:
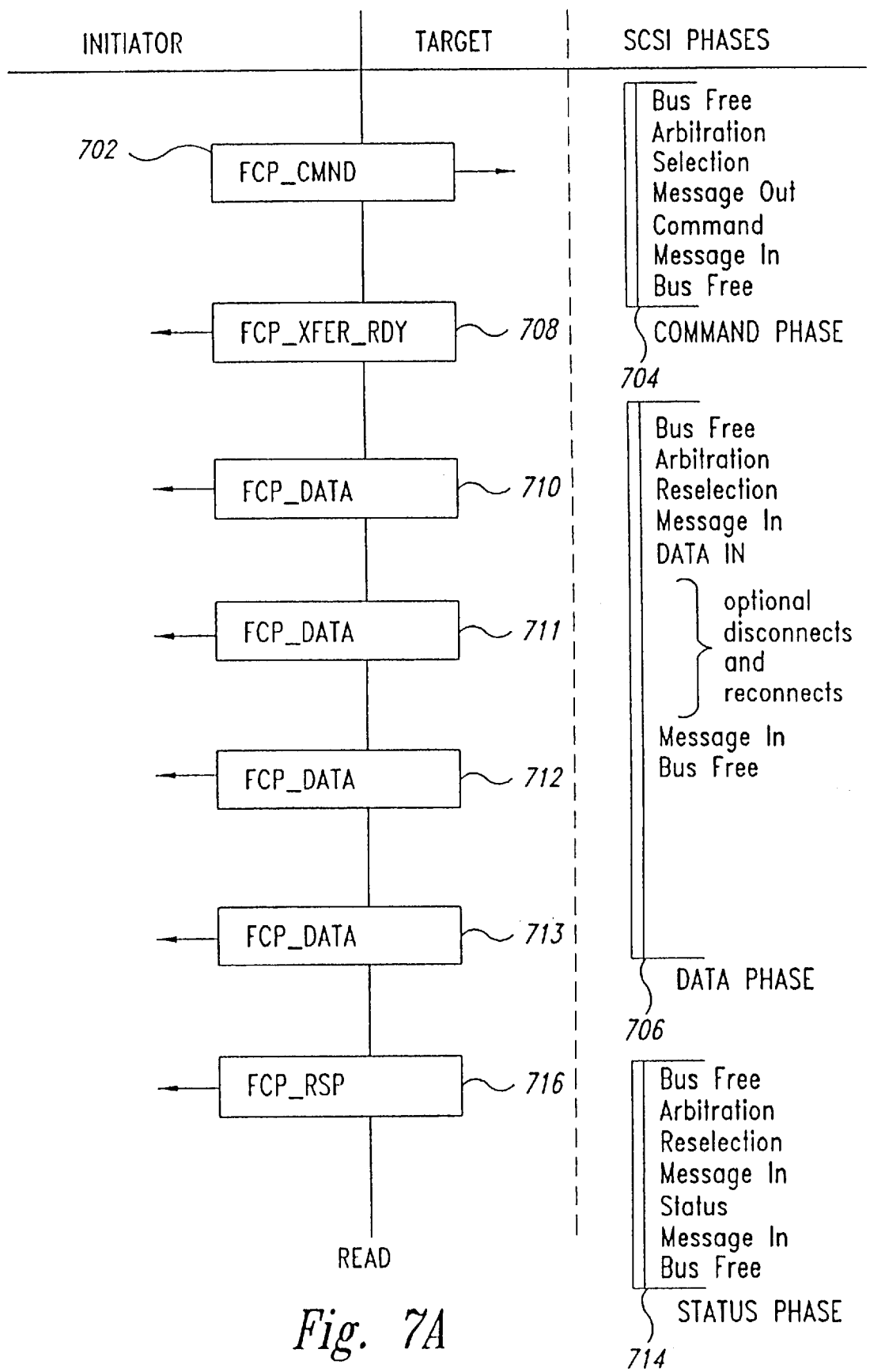
FIGS. 7A–7B illustrate a mapping of the FC Protocol to SCSI sequences exchanged between an initiator and target and the SCSI bus phases and states described in FIGS. 6A–6C.
Figure 7B:
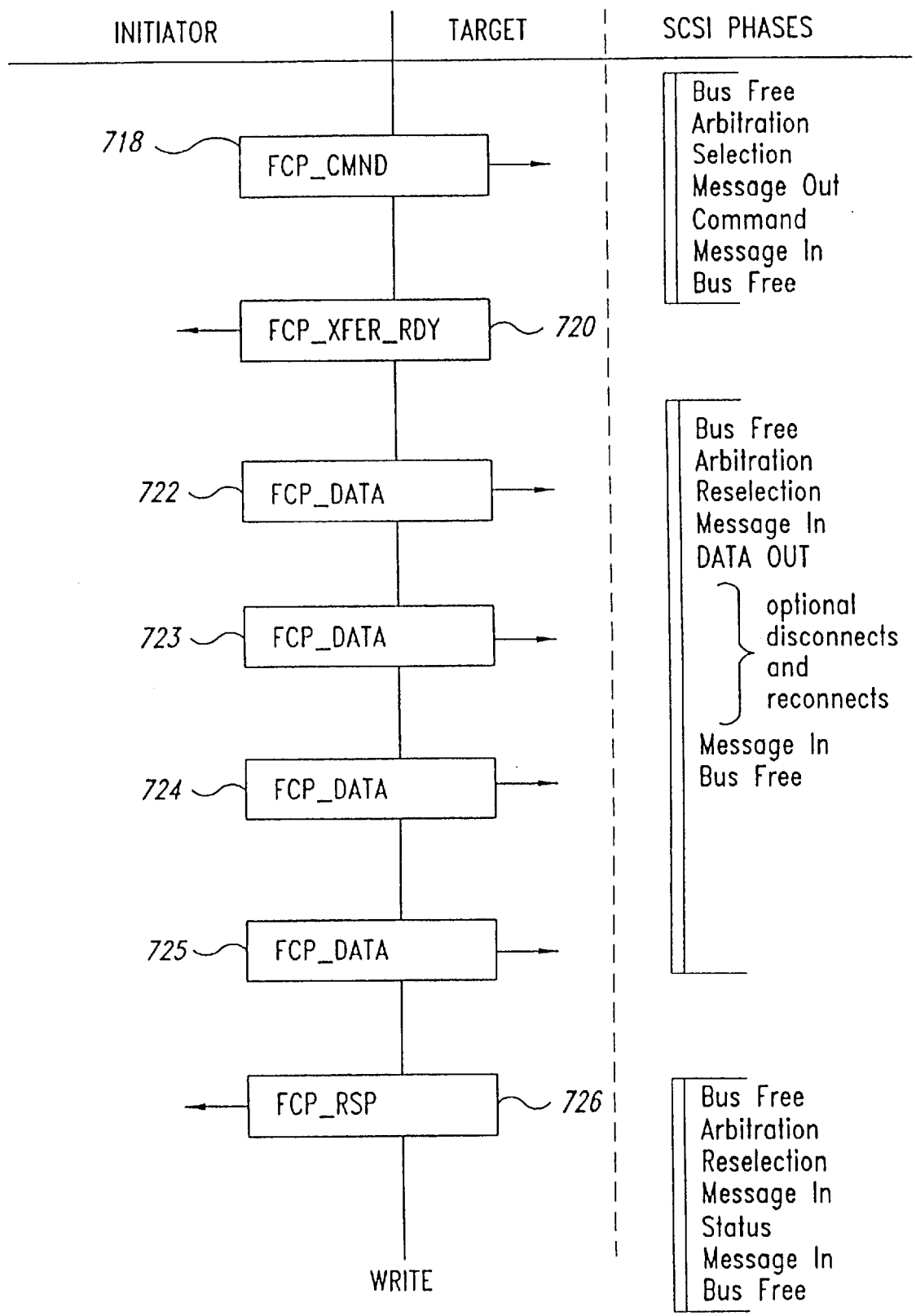

FIGS. 7A and 7B illustrate a mapping of FCP sequences exchanged between an initiator and target and the SCSI bus phases and states described in FIGS. 6A–6C. In FIGS. 7A–7B, the target SCSI adapter is assumed to be packaged together with a FCP host adapter, so that the target SCSI adapter can communicate with the initiator via the FC and with a target SCSI device via the SCSI bus. FIG. 7A shows a mapping between FCP sequences and SCSI phases and states for a read I/O transaction. The transaction is initiated when the initiator sends a single-frame FCP sequence containing a FCP_CMND data payload through the FC to a target SCSI adapter 702. When the target SCSI-bus adapter receives the FCP_CMND frame, the target SCSI-bus adapter proceeds through the SCSI states of the command phase 704 illustrated in FIG. 6A, including ARBITRATION, RESELECTION, MESSAGE OUT, COMMAND, and MESSAGE IN. At the conclusion of the command phase, as illustrated in FIG. 6A, the SCSI device that is the target of the I/O transaction disconnects from the SCSI bus in order to free up the SCSI bus while the target SCSI device prepares to execute the transaction. Later, the target SCSI device rearbitrates for SCSI bus control and begins the data phase of the I/O transaction 706. At this point, the SCSI-bus adapter may send a FCP_XFER_RDY single-frame sequence 708 back to the initiator to indicate that data transmission can now proceed. In the case of a read I/O transaction, the FCP_XFER_RDY single-frame sequence is optional. As the data phase continues, the target SCSI device begins to read data from a logical device and transmit that data over the SCSI bus to the target SCSI-bus adapter. The target SCSI-bus adapter then packages the data received from the target SCSI device into a number of FCP_DATA frames that together compose the third sequence of the exchange corresponding to the I/O read transaction, and transmits those FCP_DATA frames back to the initiator through the FC. When all the data has been transmitted, and the target SCSI device has given up control of the SCSI bus, the target SCSI device then again arbitrates for control of the SCSI bus to initiate the status phase of the I/O transaction 714. In this phase, the SCSI bus transitions from the BUS FREE state through the ARBITRATION, RESELECTION, MESSAGE IN, STATUS, MESSAGE IN and BUS FREE states, as illustrated in FIG. 3C, in order to send a SCSI status byte from the target SCSI device to the target SCSI-bus adapter. Upon receiving the status byte, the target SCSI-bus adapter packages the status byte into an FCP_RSP single-frame sequence 716 and transmits the FCP_RSP single-frame sequence back to the initiator through the FC. This completes the read I/O transaction.

In many computer systems, there may be additional internal computer buses, such as a PCI bus, between the target FC host adapter and the target SCSI-bus adapter. In other words, the FC host adapter and SCSI adapter may not be packaged together in a single target component. In the interest of simplicity, that additional interconnection is not shown in FIGS. 7A–B.

FIG. 7B shows, in similar fashion to FIG. 7A, a mapping between FCP sequences and SCSI bus phases and states during a write I/O transaction indicated by a FCP_CMND frame 718. FIG. 7B differs from FIG. 7A only in the fact that, during a write transaction, the FCP_DATA frames 722–725 are transmitted from the initiator to the target over the FC and the FCP_XFER_RDY single-frame sequence 720 sent from the target to the initiator 720 is not optional, as in the case of the read I/O transaction, but is instead mandatory. As in FIG. 7A, the write I/O transaction includes when the target returns an FCP_RSP single-frame sequence 726 to the initiator.

The Tachyon TL FC Mass Storage Interface Controller and Tachyon TL Interface The Tachyon TL FC Mass Storage Interface Controller ("TL") is a high-performance, low-cost, loop-based interface controller for use in the FC Ports that interconnect peripheral devices and computers to an FC arbitrated loop. In this subsection, an overview of the functionality of, and interface to, the TL will be presented. A more detailed description of the TL is included in U.S. patent application Ser. No. 09/183,164, entitled "Fibre Channel Controller," assigned to the Hewlett Packard Company, and filed on Oct. 30, 1998 that is hereby incorporated by reference in its entirety.

Figure 8:
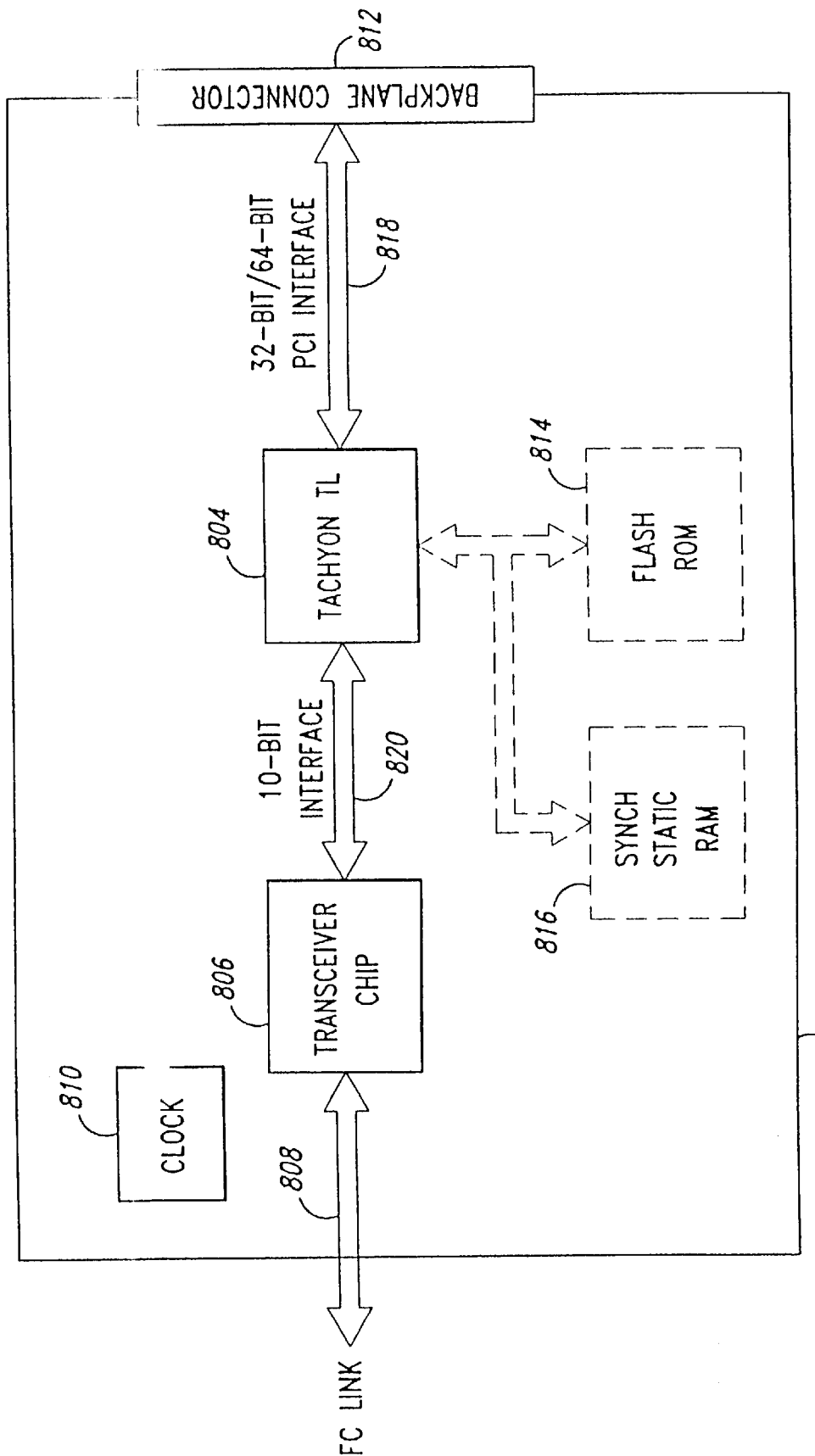
FIG. 8 shows a Tachyon TL FC Mass Storage Interface Controller incorporated into a typical FC/PCI host adapter.

FIG. 8 shows a TL incorporated into a typical FC/PCI host adapter. The FC/PCI host adapter 802 comprises a TL 804, a transceiver chip 806, an FC link 808, a clock 810, a backplane connector 812, and, optionally, a boot flash ROM 814, or a local synchronous static random access memory ("RAM") 816. The FC host adapter 802 communicates with the processor or processors of an FC node via the backplane connector 812 and a PCI bus within the FC node to which the processor or processors are coupled. The TL 804 is coupled to the backplane connector 812 via a PCI interface 818. The TL sends and receives FC frames to and from an FC arbitrated loop via a full-duplex 10-bit interface 820 that couples the TL to the transceiver chip 806, which is, in turn, coupled to the FC arbitrated loop via the FC link 808. The clock 810 interfaces to the FC link. The FC host adapter 802 may serve, in terms of the previous discussion, as an NL_Port, and the FC host adapter 802, together with the computer system to which it is coupled via the backplane connector 812, compose an FC node that may be connected via the FC link 808 to an FC arbitrated loop topology.

Figure 9:
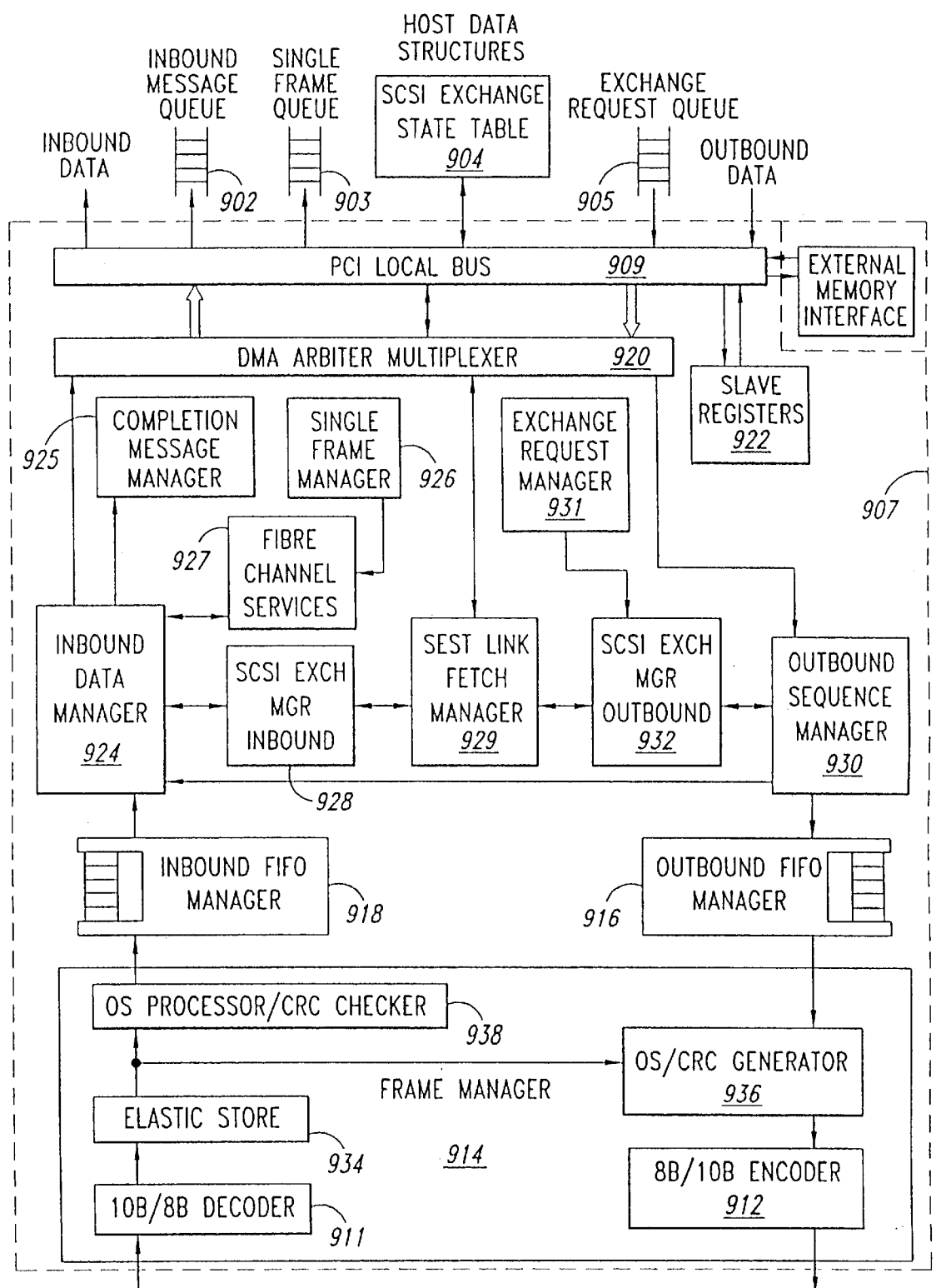
FIG. 9 shows a block diagram description of the Tachyon TL FC Mass Storage Interface Controller and the memory-based data structure interface between the Tachyon TL FC Mass Storage Interface Controller and the host.

FIG. 9 shows a block diagram description of the TL and the memory-based data structure interface between the TL and the host to which the TL is interconnected by a PCI bus. The memory-based data structures 902–905 are maintained in a memory component of the FC node that is accessible to the TL 907 via the PCI bus 909. In FIG. 9, the TL 907 is represented as being combined with the backplane connector (812 in FIG. 8) and PCI bus 909. The TL interfaces with a transceiver chip (806 in FIG. 8) via a 10 bit/8 bit decoder 911, for receiving inbound frames from the transceiver chip (806 in FIG. 8) and via an 8 bit/10 bit encoder 912 for outbound frames transmitted by the TL to the transceiver chip. The 10 bit/8 bit decoder 911 and 8 bit/10 bit encoder 912 are both subcomponents of the frame manager 914 that receives FC frames for transmission to the transceiver chip (806 in FIG. 8) from the TL via the outbound FIFO manager 916 and that receives a stream of data bits from the transceiver chip (806 in FIG. 8) via the 10 bit/8 bit decoder 911, processes the received data bits into FC frames, and stores the FC frames into the inbound FIFO manager 918. The other frame manager components 934, 936, and 938 buffer received data when the lack of clock synchronization between the transmitter and receiver components of the transceiver chip prevent immediate processing of the received data, generate FCP CRCs, and check FCP CRCs, respectively, The DMA arbiter multiplexer 920 manages multiple internal DMA requests to the PCI local bus and the external memory interface. Internal block arbitration, as well as data path multiplexing, occurs in this block.

The processor or processors of the FC node control and exchange information with the TL by writing and reading various control registers 922 and by placing data into, and removing data from, the memory-based data structures 902–905. Internal components of the TL 924–932 read and write the control registers 922, receive data from, and place into, the memory based data structures 902–905, and exchange FC frames with the frame manager 914 via the inbound FIFO manager 918 and the outbound FIFO manager 916.

The inbound message queue ("IMQ") 902 contains completion messages that notify the host processor or processors of inbound and outbound transaction information and status information. The single frame queue ("SFQ") contains inbound unknown or unassisted FC frames that the TL 907 receives from the frame manager 914 and places into the SFQ. The SCSI exchange state table ("SEST") 904 is shared between the TL and the host and contains SEST entries that each corresponds to a current SCSI exchange (I/O operation). The exchange request queue ("ERQ") 905 contains I/O request blocks ("IRBs") that represent I/O requests sent by the host to the TL.

The completion message manager 925 manages the IMQ and provides queue entries to the inbound data manager 924 into which the inbound data manager places completion messages. The single frame manager 926 manages the SFQ in host memory and provides entries to the Fibre Channel services component 927 into which the Fibre Channel component services place inbound frames. The exchange request manager 931 fetches new entries from the ERQ and sends them to the SCSI exchange manger-outbound ("SEM-OUT") for processing. The inbound data manager 924 informs the inbound frame processors, i.e. the SCSI exchange manager-inbound ("SEM-IN") 928 and Fibre Channel services component 927, of new frames and routes the frames to their proper destination in the host. Also, the inbound data manager sends completion messages to the host via the IMQ. The Fibre Channel services component 927 manages the Fibre Channel frames that the SEM-IN 928 does not manage. The Fibre Channel services component places the frames in the SFQ. The SEM-IN 928 manages the phases of a SCSI exchange that receive a Fibre Channel sequence. The SEM-IN reads the SEST entries via the SEST link fetch manager 929 and either sends the inbound data to the proper host buffers or sends the request to the SEM-OUT 932 to send the next phases of Fibre Channel sequence. The SEST link fetch manager 929 is responsible for reading and writing SEST entries, depending upon requests from the SEM-IN 928 and SEM-OUT 932 components. The SEM-OUT 932 manages the phases of a SCSI exchange that require a Fibre Channel sequence to be sent. The SEM-OUT 932 reads the SEST entries via the SEST link fetch manager 929, builds the request to send those sequences, and sends the requests to the outbound sequence manager 930. The outbound sequence manager ("OSM") 930 processes requests from the SEM-OUT 932 to send Fibre Channel sequences from the host and retrieves Fibre Channel frame headers and payloads from the host to send to the remote node. The OSM segments the sequence into Fibre Channel frames of up to 1 KByte in size and queues them into the outbound FIFO manager 916.

Figure 10:
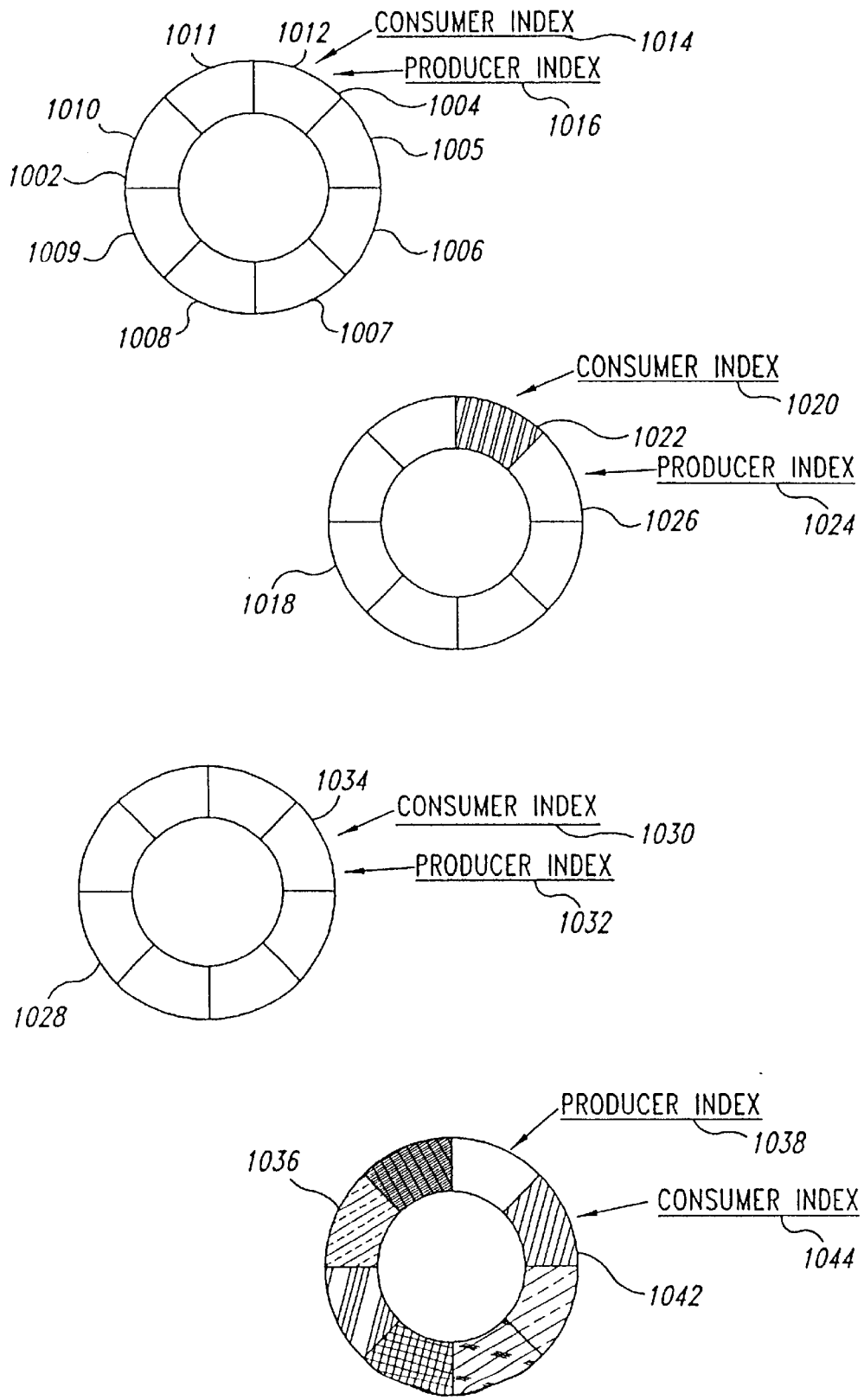
FIG. 10 shows the basic underlying circular queue data structure used in the Tachyon TL Fibre Channel Mass Storage Interface Controller interface.

The IMQ 902, SFQ 903, and ERQ 905 are implemented as circular queues. FIG. 10 shows the basic underlying circular queue data structure used in the TL controller interface. A circular queue is a first-in-first-out ("FIFO") queue that is logically represented in a circular fashion, such as the depiction of the circular queue 1002 at the top of FIG. 10. Each radial section 1004–1012, or slot, of a circular queue contains space for a queue entry, essentially a record-like data structure containing one or more data fields. The circular queue 1002 in FIG. 10 is shown with 8 queue entry slots 1004–1012 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 1014 and the producer index 1016 point to the same empty queue entry slot 1012.

When a producer adds a queue entry to an empty circular queue 1002, a circular queue with one valid queue entry 1018 is produced. The consumer index 1020 is not changed, as a result of which the consumer index points to the single valid queue entry 1022 in the circular queue 1018. After the producer inserts the queue entry 1022, the producer increments the producer index 1024 to point to the next available slot 1026 within the circular queue 1018 into which the producer can add a second queue entry. If the consumer now removes the single queue entry 1022, an empty circular queue 1028 is produced. When the consumer has removed the available queue entry 1022, the consumer increments the consumer index 1030. As in the previous depiction of an empty circular queue 1002, the empty circular queue 1028 produced by removing the single queue entry 1022 has both the consumer index 1030 and the producer index 1032 pointing to the same empty, available queue entry slot 1034. If a producer successively adds queue entries at a faster rate than a consumer can consume them, a full circular queue 1036 will eventually be produced. In a full circular queue 1036, the producer index 1038 points to a single empty queue entry slot within the circular queue that immediately precedes the first available valid queue entry 1042 pointed to by the consumer index 1044.

Figure 11A:
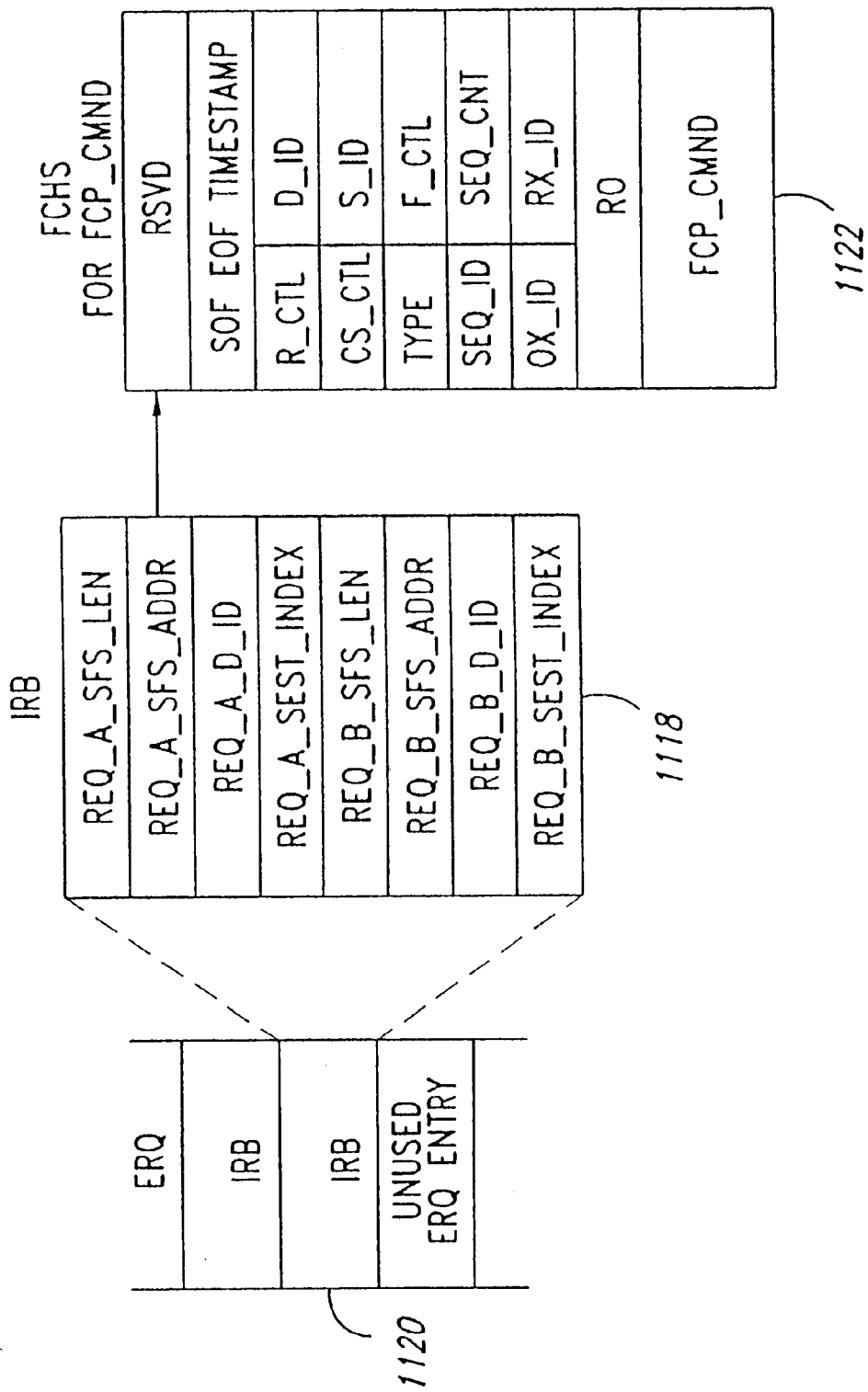
FIGS. 11A–11B show a detailed view of the host memory data structures required to perform an initiated FC Protocol for SCSI write operation from four or more data buffers.
Figure 11B:
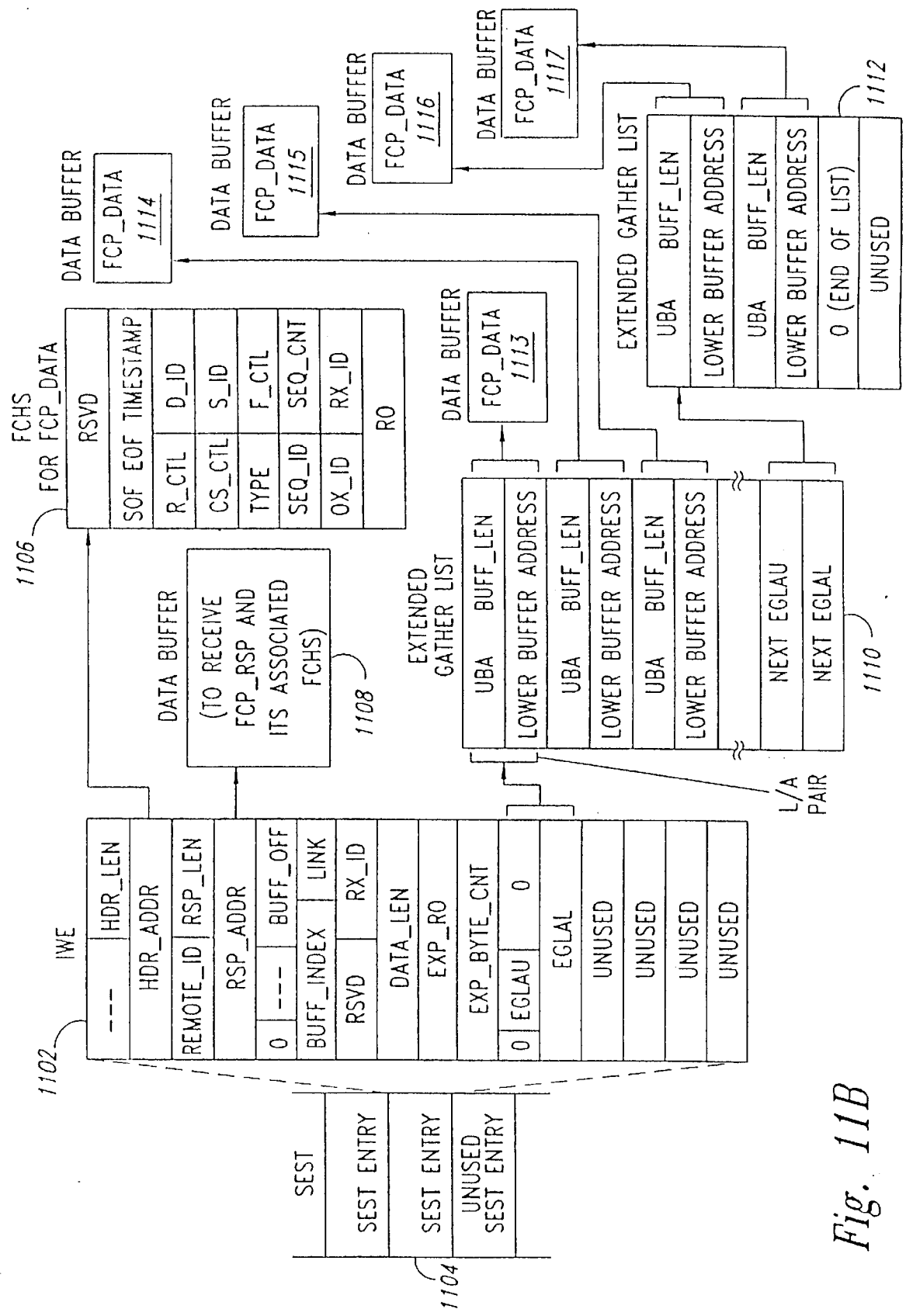

FIGS. 11A–11B show a more detailed view of the host memory data structures required to perform an FCP write operation where the FC node in which a TL resides is the initiator of the FCP write operation and where the data payload that will include the data to be written requires 4 or more data buffers. The host prepares an initiator write entry ("IWE") 1102 within a SEST entry 1104 in the SEST (904 in FIG. 9). Associated with the IWE are: (1) a Fibre Channel header structure ("FCHS") 1106 that is used to send the FCP_DATA sequence; (2) a data buffer 1108 that is used to receive the FCP_RSP frame from the SCSI target; and (3) one or more extended scatter gather list ("SGL") pages 1110 and 1112 that contain pointers to data buffers 1113–1117 in which the host places the data to be written to the SCSI target via the FCP_DATA sequence. The host then creates an I/O request block ("IRB") 1118 in an unused ERQ entry 1120 and associates the IRB with an FCHS 1122 that is used for the FCP_CMND sequence. The host then increments the ERQ producer index. The producer index increment is detected by the TL, and the TL then launches the FCP write operation. The TL uses the information and data stored within the IRB 1118 and RWE 1102, and the data structures associated with the IRB and RWE, to conduct the entire FCP write operation, including the FCP_CMND sequence, the FCP_XFER_RDY sequence, and the FCP_DATA sequence. The TL receives from the target a FCP_RSP sequence at the completion of the FCP write operation.

Figure 12A:
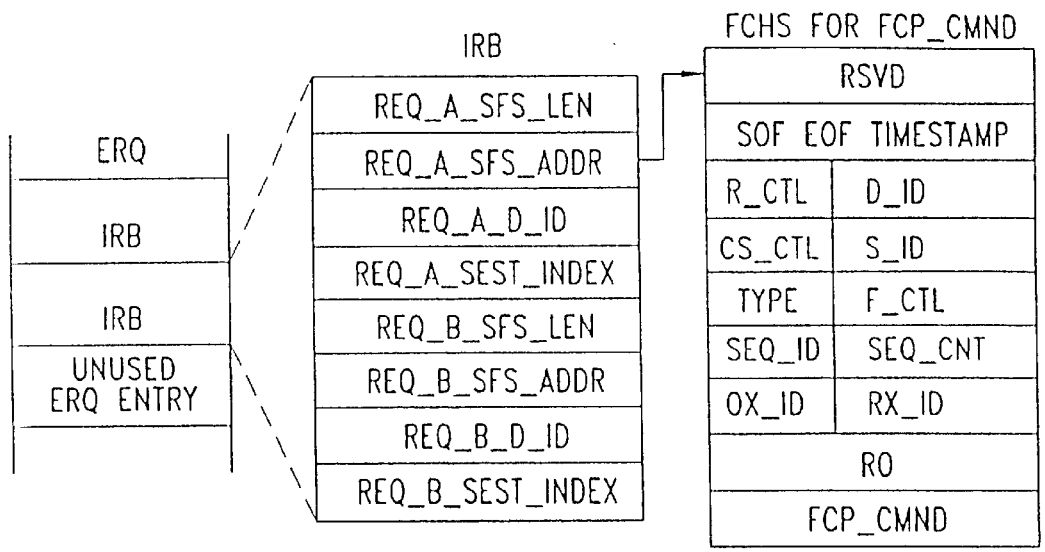
FIGS. 12A–12B show the host memory data structures required to perform an initiated FC Protocol for SCSI write operation from three or less data buffers.
Figure 12B:
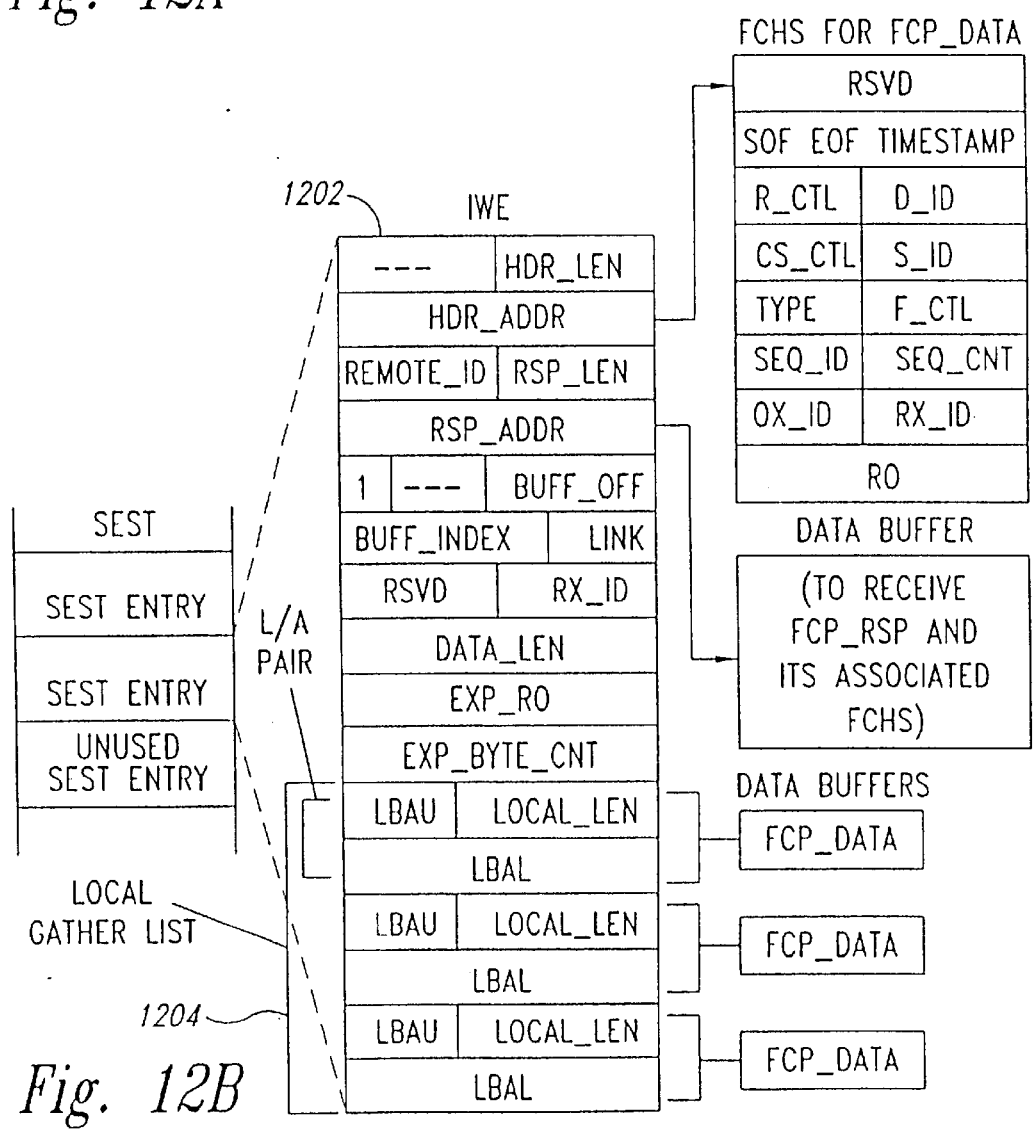

FIGS. 12A–12B show the host memory data structures required to perform an FCP write operation where the FC node within which the TL resides is the initiator of the FCP write operation and the data payload of the FCP_DATA sequence can fit into three or fewer data buffers. The data structure shown in FIGS. 12A–12B are similar to those shown in FIGS. 11A–11B with the exception that, rather than having extended SGL pages (1110 and 1112 in FIG. 11) external from the IWE (1102 in FIG. 11B), the IWE 1202 in FIG. 12B includes a local SGL 1204 that is included within the IWE 1202. Otherwise, the operations carried out by the TL in response to the incrementing of the ERQ producer index by the host are analogous to those carried out for the FCP write operation described above with reference to FIGS. 11A–11B.

Figure 13A:
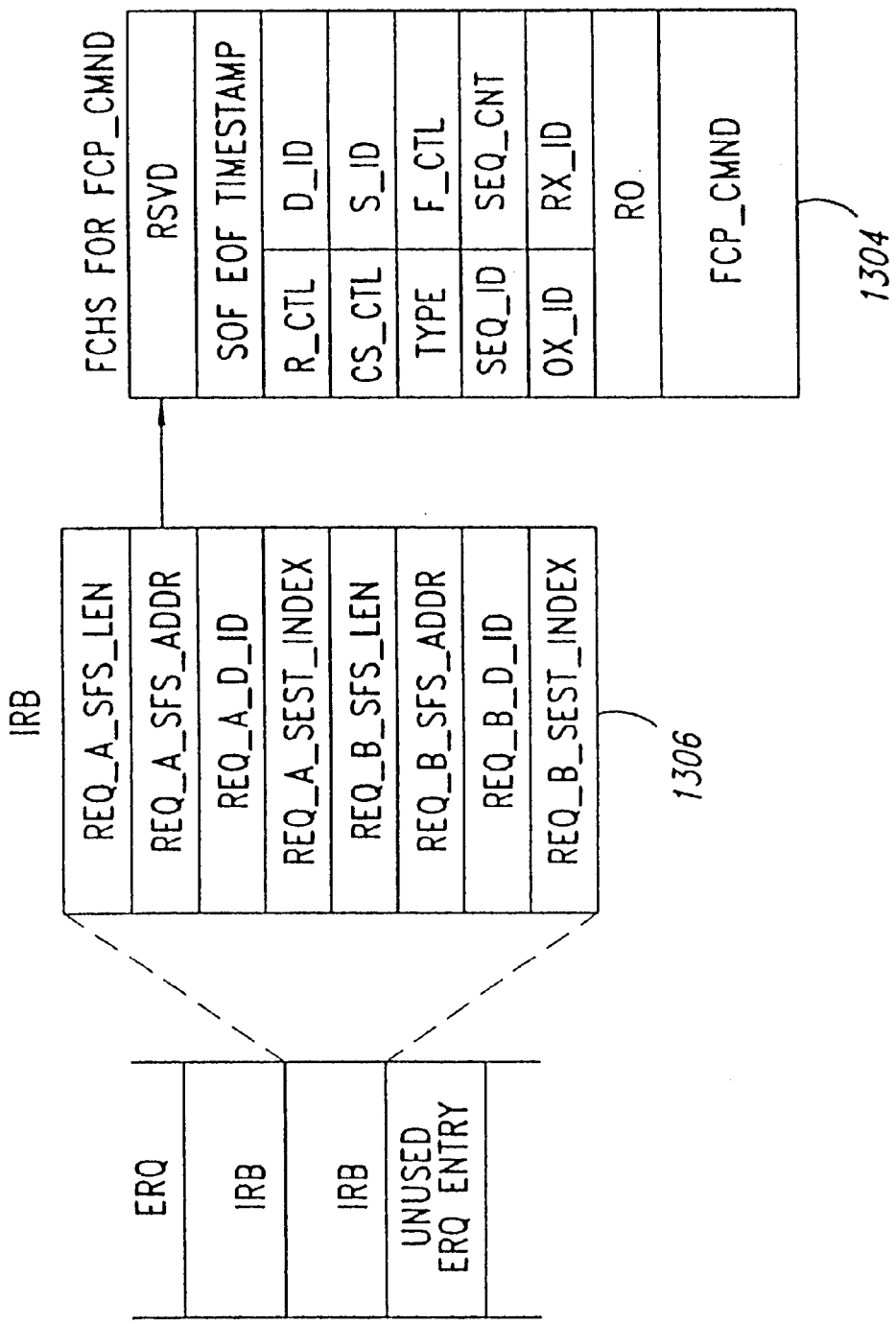
FIGS. 13A–13B show the host memory data structures used to perform an initiated FC Protocol for SCSI read operation to more than three data buffers.
Figure 13B:
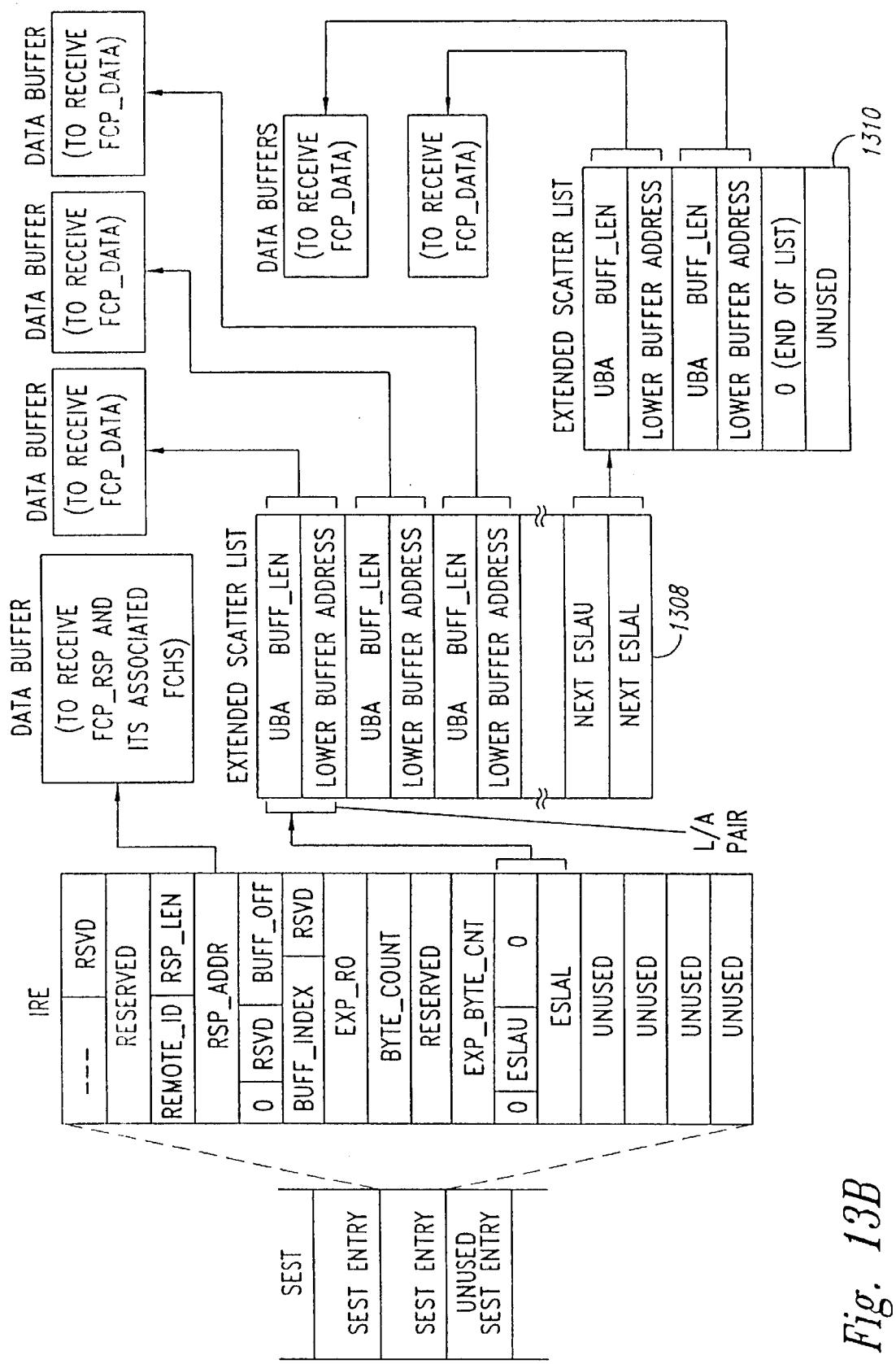

FIGS. 13A–13B show the host memory data structures used to perform an FCP read operation where the FC node in which the TL resides is the initiator of the read operation and the data to be read will fill more than three data buffers. These data structures are similar to those shown in FIGS. 11A–11B with the following exceptions: (1) rather than an IWE (1102 in FIG. 11B), the SEST entry created by the host contains an initiator read entry ("IRE"); (2) there is no FCHS for the FCP_DATA sequence (1106 in FIG. 11B); and (3) the FCHS for the FCP_CMND sequence 1304 associated with the IRB 1306 contains a read command, rather than a write command as in the case of the FCHS (1122 in FIG. 11A) for the write operation. As with the write operation, the host updates the ERQ producer index in order to initiate the read operation, and the TL uses the information stored in the data structures in FIGS. 13A–13B to conduct the FCP_CMND sequence and the FCP_DATA sequences, and receives the FCP_RSP sequence from the target SCSI device at the conclusion of the read operation.

Figure 14A:
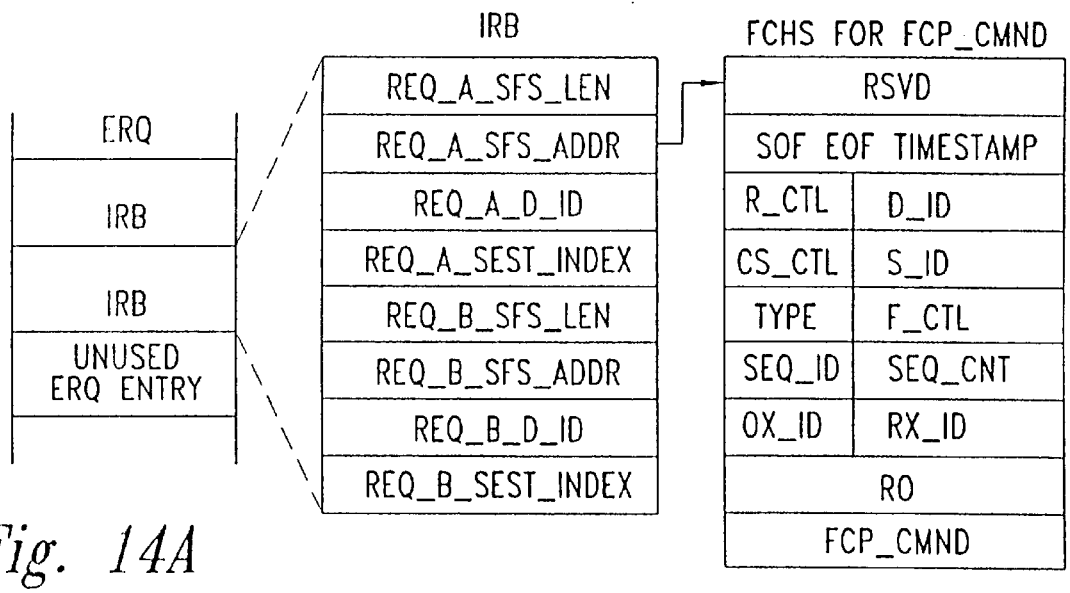
FIGS. 14A–14B show the data structures required to perform an initiated FC Protocol for SCSI read operation to three or fewer data buffers.
Figure 14B:
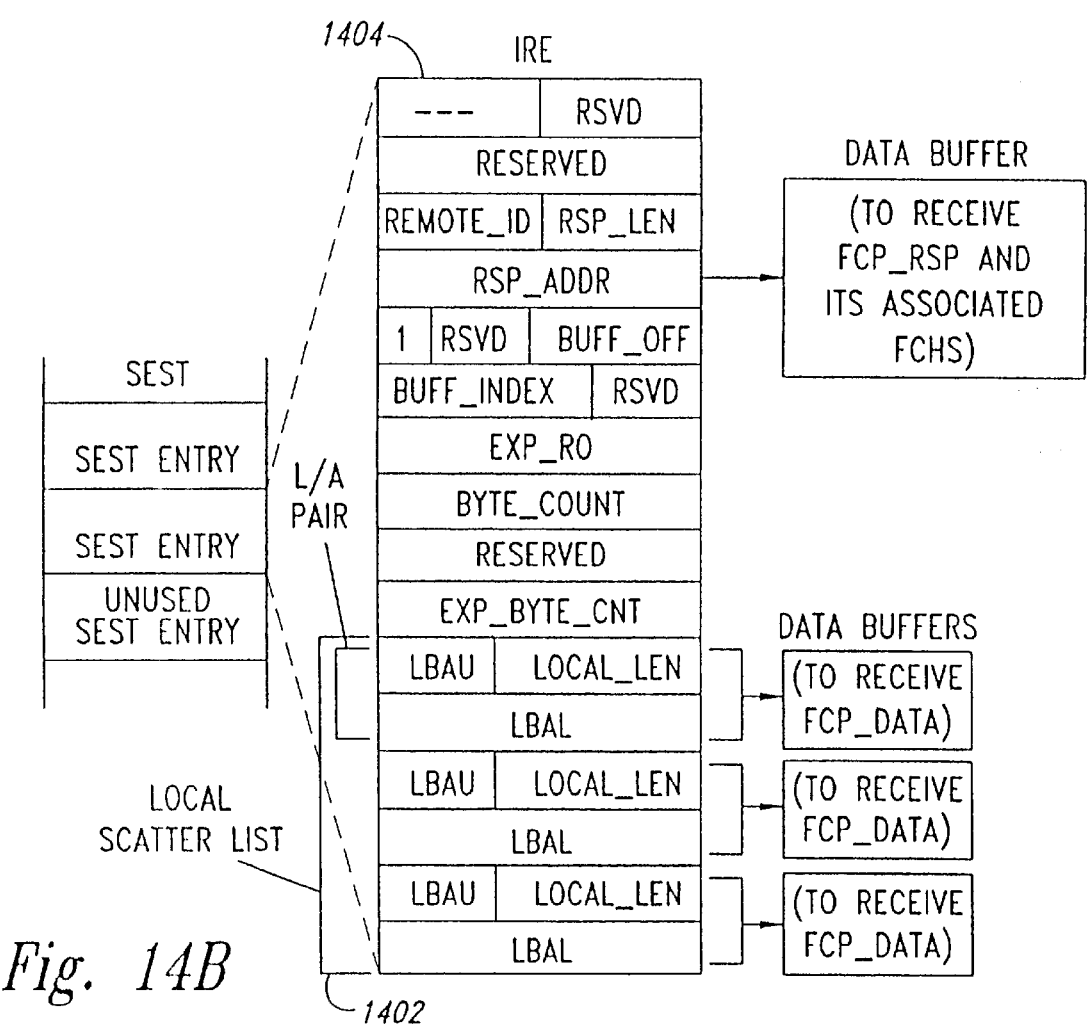

FIGS. 14A–14B show the data structures required to perform the FCP read operation where the FC node in which the TL resides is the initiator of the operation and where the data to be received can fit into three or fewer data buffers. FIGS. 14A–14B bear the same relationship to FIGS. 13A–13B as FIGS. 12A–12B bear to FIGS. 11A–11B. Instead of the external extended FCL pages (1308 and 1310 in FIG. 13B), a local SGL 1402 is included within the IRE 1404. Otherwise, the operations conducted by the TL in order to complete the FCP read operation are identical with those discussed with reference to FIGS. 13A–13B.

Figure 15A:
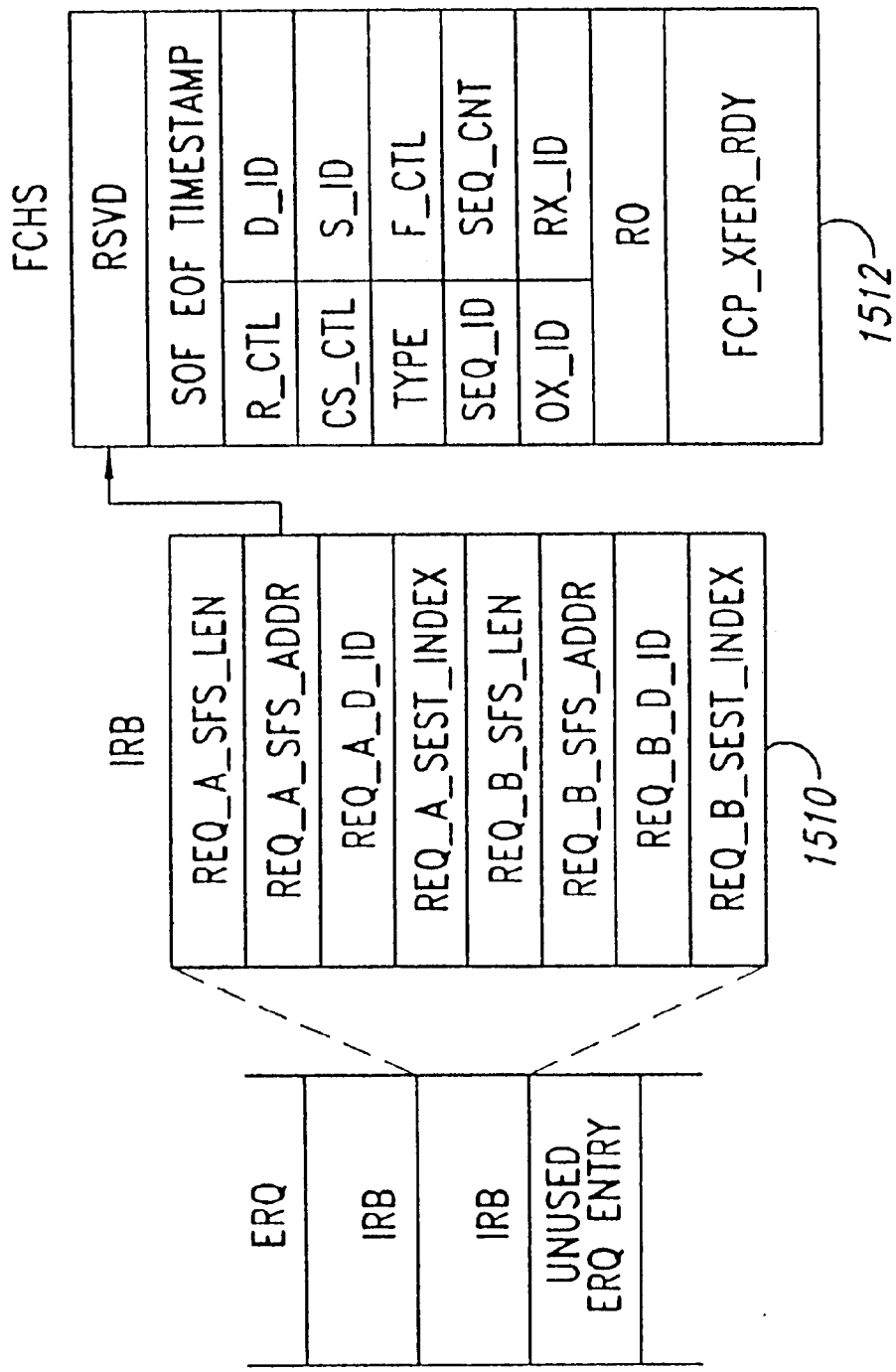
FIGS. 15A–15B show the host memory data structures required for an FC node that is the target of an PC Protocol for a SCSI write operation initiated by another FC node to more than three data buffers.
Figure 15B:
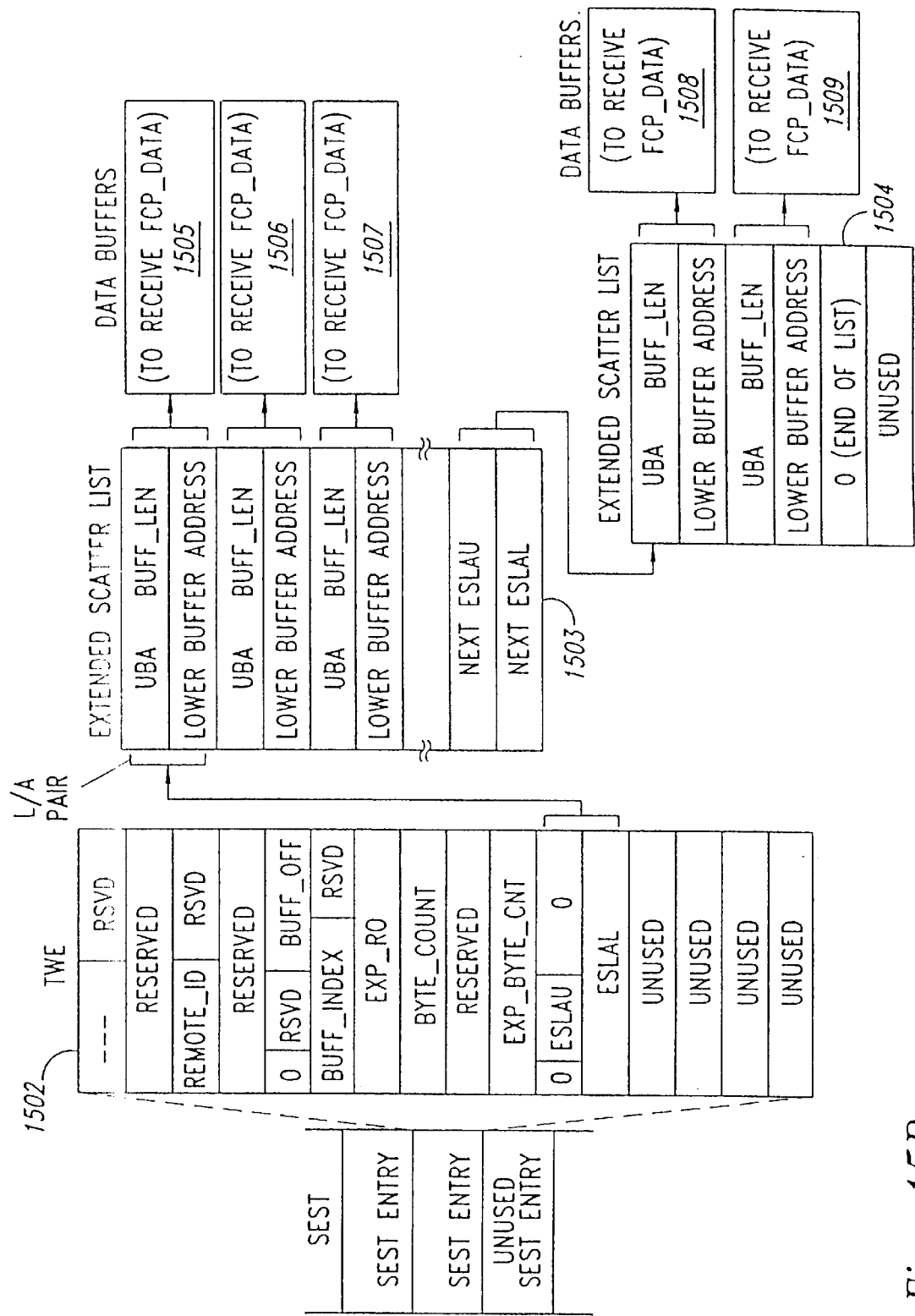

FIGS. 15A–15B show the host memory data structures required for an FC node that is the target of a FCP write operation initiated by another FC node to carry out the indicated FCP write operation at the FC target node. When the TL in the FCP target node receives a FCP_CMND frame from the FC initiator node, the TL places it into the SFQ (903 in FIG. 9) and notifies the host via an inbound completion message. Upon receiving the inbound completion message, the host allocates and fills in the data structures shown in FIGS. 13A–13B. These include the target write entry ("TWE") 1502 which is associated with one or more external extended SGL pages 1503 and 1504. These external extended SGL pages are, in turn, associated with data buffers 1505–1509 in which the data transferred from the FC initiator node will be placed after being extracted from the FCP_DATA sequence. The host also creates an IRB 1510 associated with an FCHS 1512 for the FCP_XFER_RDY sequence that will be transmitted back to the FC initiator node in order to elicit the FCP_DATA sequence. The host initiates sending of the FCP_XFER_RDY sequence and subsequent reception of the write data by updating the ERQ producer index register.

Figure 16A:
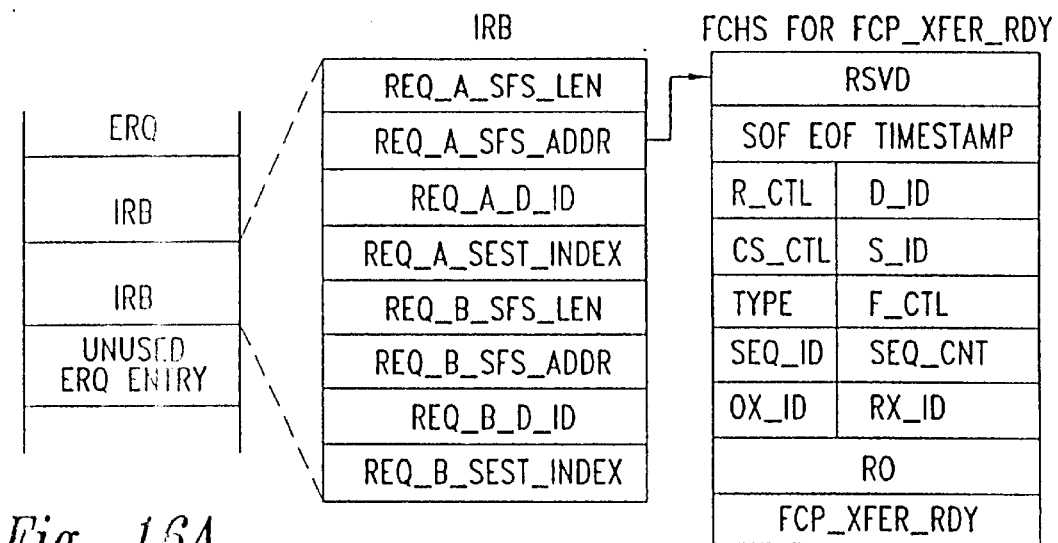
FIGS. 16A–16B show the host memory data structures required for an FC node that is the target of an FC Protocol for a SCSI write operation initiated by another FC node to three or fewer data buffers.
Figure 16B:
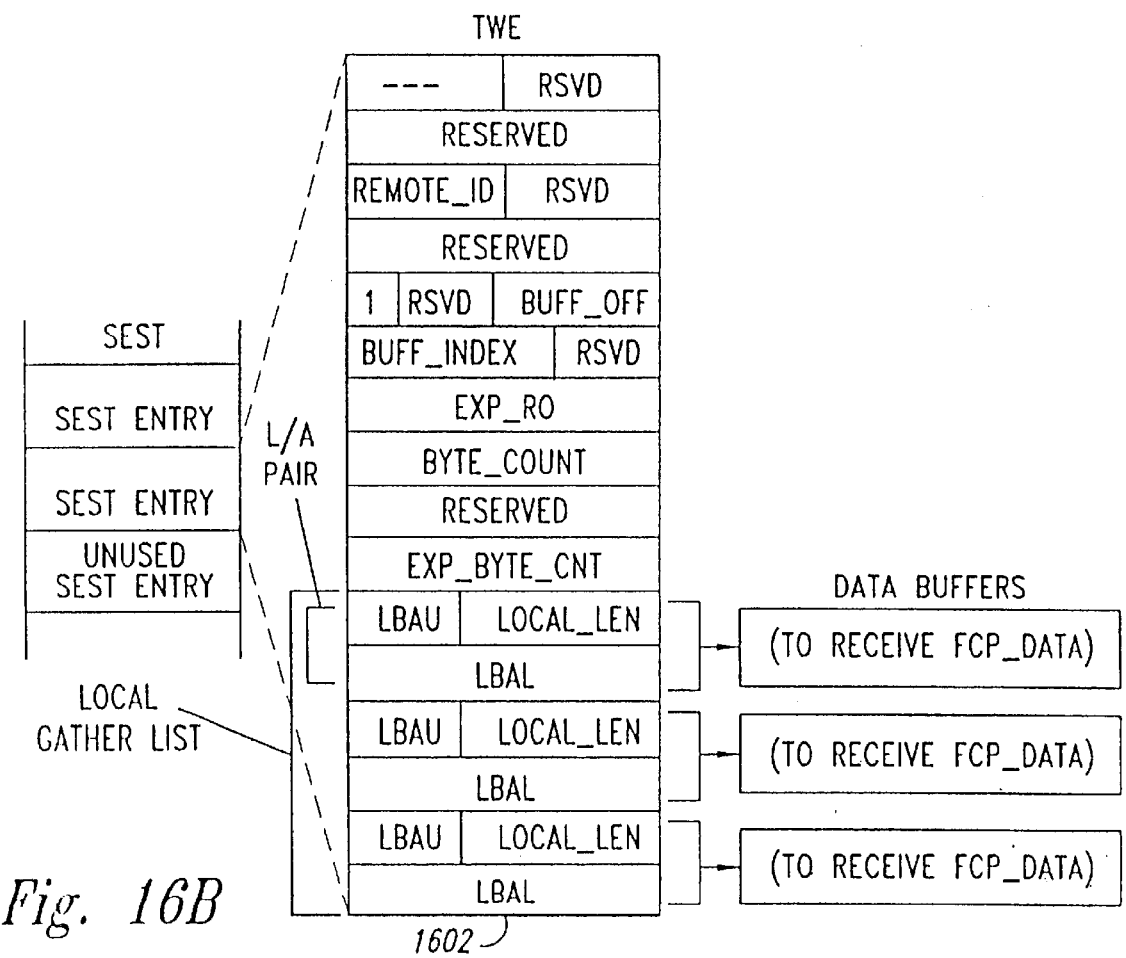

FIGS. 16A–16B bear the same relationship to FIGS. 15A–15B as FIGS. 12A–12B bear to FIGS. 11A–11B and FIGS. 14A–14B bear to FIGS. 13A–13B showing the host memory structures for a targeted FCP write operation employing a SGL. The only essential difference between FIGS. 15A–15B and 16A–16B are that the external extended SGL pages (1503 and 1504 in FIG. 15B are replaced by a local SGL 1602.

Figure 17A:
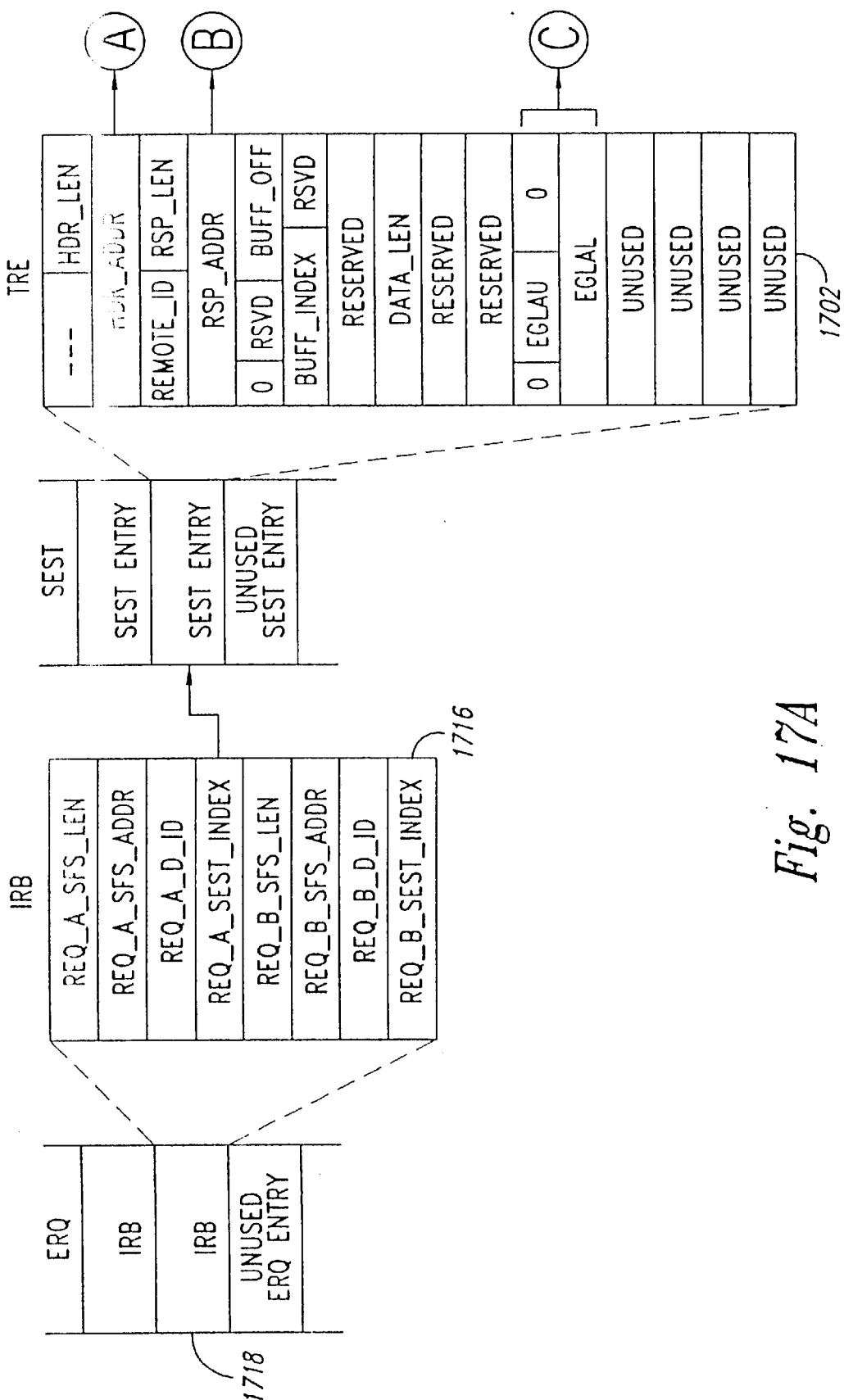
FIGS. 17A–17B show the host memory data structures required for an FC target node to carry out a read operation initiated by an FC initiator node from more than three data buffers.
Figure 17B:
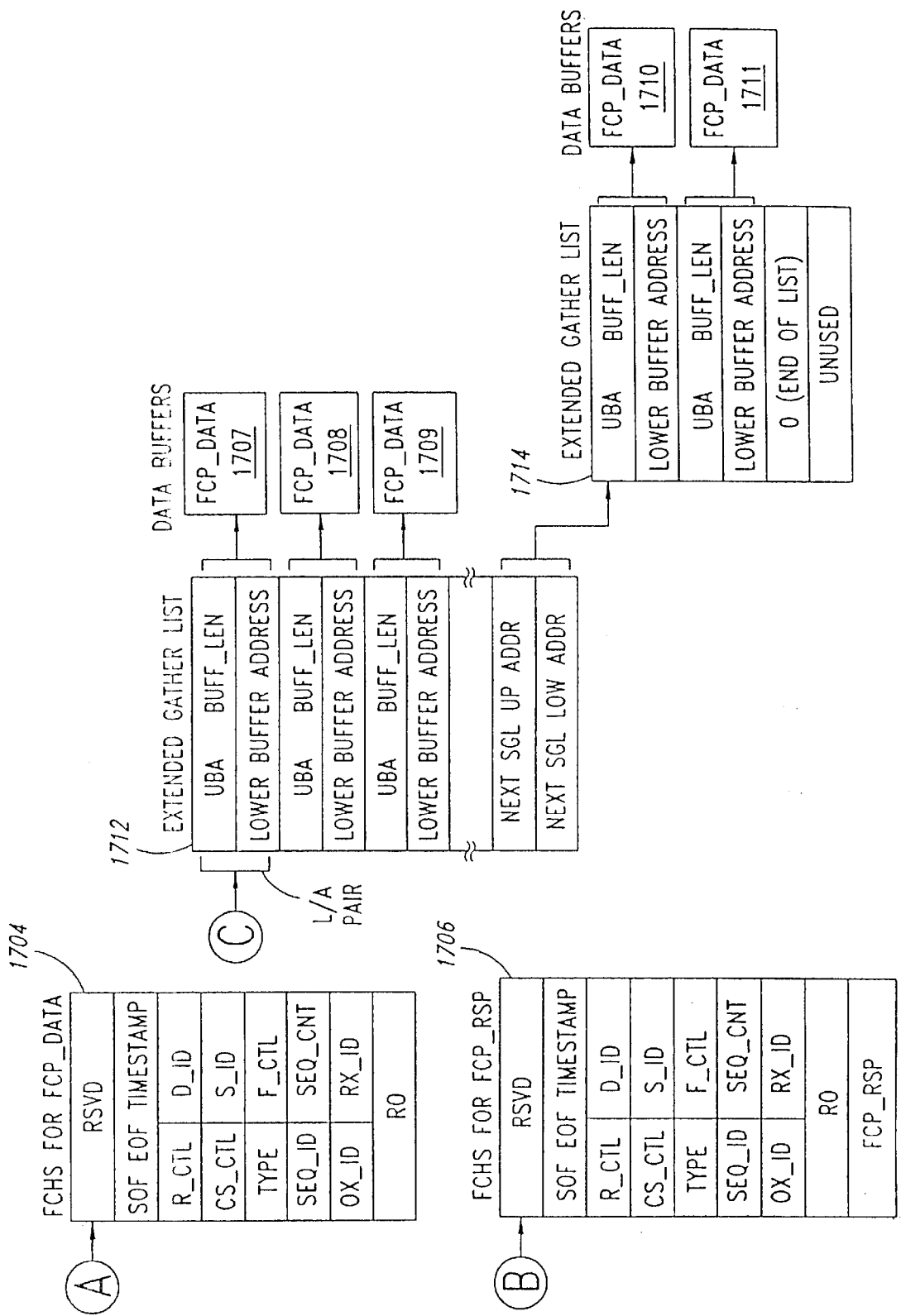

FIGS. 17A–17B shows the host memory data structures required for an FC target node to carry out a read operation initiated by an FC initiator node. These data structures are similar to the data structures required by an FC target node to respond to an FCP write operation, shown in FIGS. 15A–15B, with the following exceptions: (1) there is no FCHS for a FCP_XFER_RDY operation (1512 in FIG. 15A) since no FCP_XFER_RDY sequence is involved; (2) the TWE (1502 in FIG. 15B) is replaced in FIG. 17A with a target read entry ("TRE") 1702; and (3) an FCHS for an FCP_DATA sequence 1704 and an FCHS for an FCP_RSP sequence 1706 are both associated with the TRE 1702. When the TL receives an FCP_CMND frame from the FC initiator node, the TL places the FCP_CMND frame into the SFQ (903 in FIG. 9) and notifies the host via an inbound completion message. When the host is notified by the inbound completion message, it interprets the contents of the FCP_CMND frame and sets up the data structures in FIGS. 17A–17B in order to respond to the SCSI read command represented by the FCP_CMND frame. The host creates in an unused SEST entry a TRE 1702 data structure and associates with the TRE 1702 the FCHS for the FCP_DATA sequence 1704 and the FSHS for the FCP_RSP sequence 1706. The host also allocates a number of data buffers that the host fills via a SCSI read operation and that will be transferred in the subsequent FCP_DATA sequence back to the FC initiator node. These data buffers 1707–1711 are referenced by one or more external extended SGL pages 1712 and 1714. The host also creates an IRB 1716 in an unused ERQ entry 1718. By updating the ERQ producer index, the host initiates the return of data solicited by the FCP read operation, mediated by the TL, resulting in sending by the FC target node the FCP_DATA sequences containing the data read from the SCSI device and a final FCP_RSP sequence indicating completion of the read command.

Figure 18:
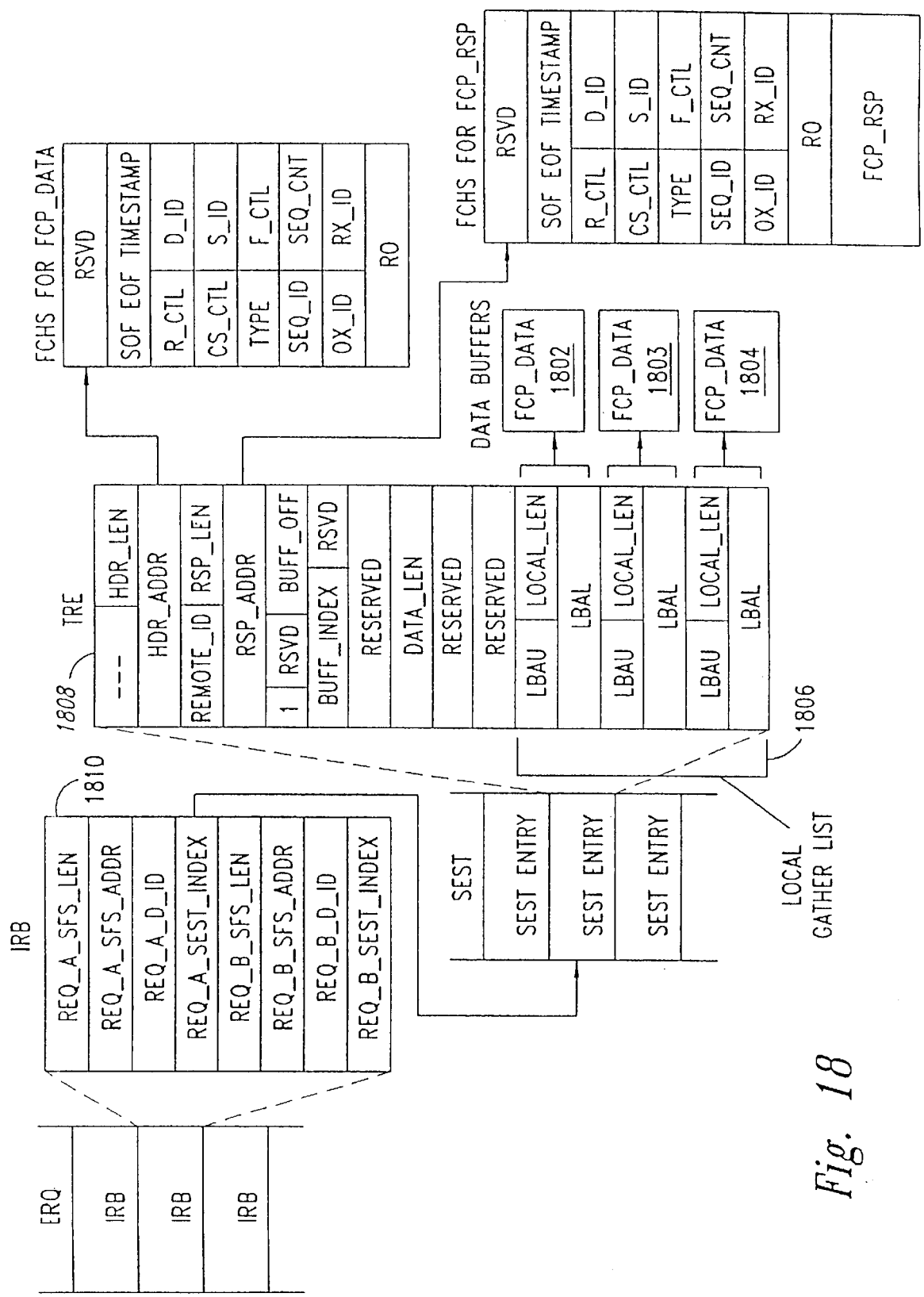
FIG. 18 shows the host memory data structures required for an FC target node to carry out a read operation initiated by an FC initiator node from three or less data buffers.

FIG. 18 bears the same relationship to FIGS. 17A–17B as FIGS. 12A–12B, 14A–14B and 16A–16B bear to FIGS. 11A–11B, 13A–13B and 15A–15B, respectively. The operations carried out by the TL in order to respond to an FCP read request are the same as those discussed with reference to FIGS. 17A–17B. The only difference in FIG. 18 is that the data buffers that contain the data read from the SCSI device 1802–1804 are referenced from a local SGL 1806 included within the TRE 1808.

Arbitrated Loop Initialization

As discussed above, the FC frame header contains fields that specify the source and destination fabric addresses of the FC frame. Both the D_ID and the S_ID are 3-byte quantities that specify a three-part fabric address for a particular FC Port. These three parts include specification of an FC domain, an FC node address, and an FC Port within the FC node. In an arbitrated loop topology, each of the 127 possible active nodes acquires, during loop initialization, an arbitrated loop physical address ("AL_PA"). The AL_PA is a 1-byte quantity that corresponds to the FC Port specification within the D_ID and S_ID of the FC frame header. Because there are at most 127 active nodes interconnected by an arbitrated loop topology, the single byte AL_PA is sufficient to uniquely address each node within the arbitrated loop.

Figure 19:
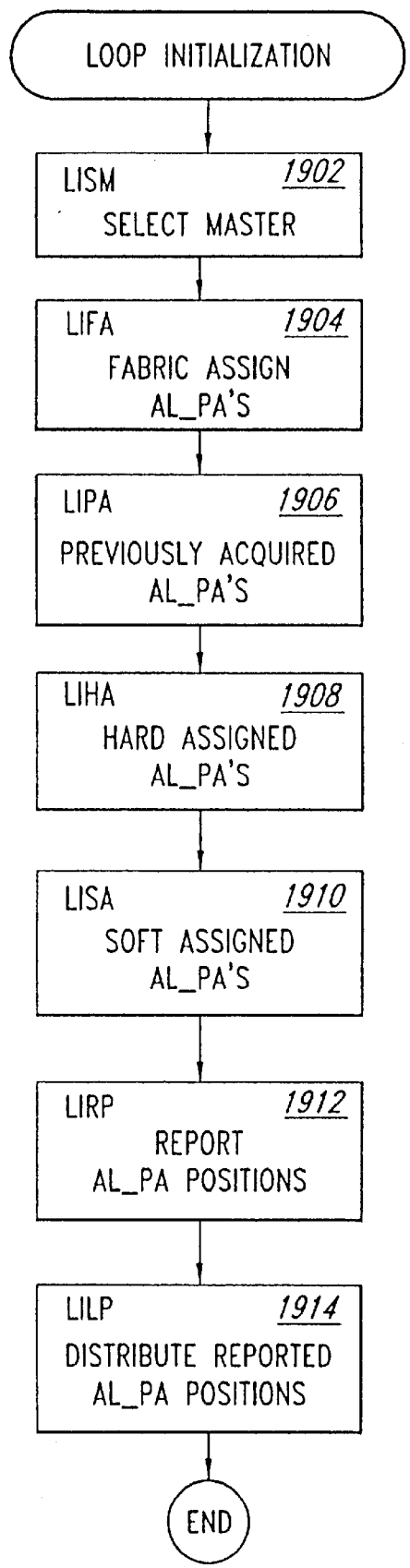
FIG. 19 shows a diagram of the seven phases of FC arbitrated loop initialization.
Figure 20:
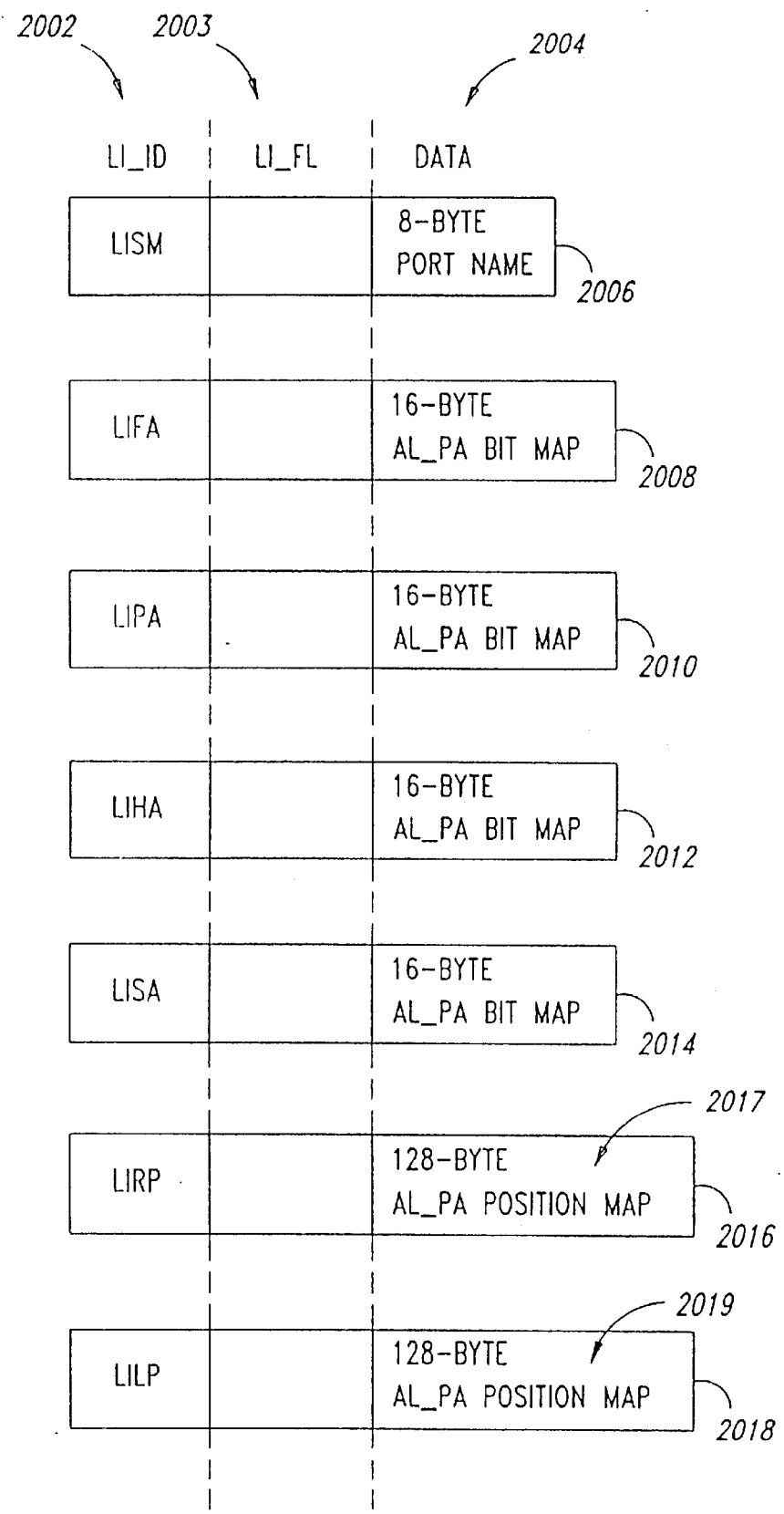
FIG. 20 shows the data payload of FC frames transmitted by FC nodes in an arbitrated loop topology during each of the seven phases of loop initialization shown in FIG. 19.

The loop initialization process may be undertaken by a node connected to an arbitrated loop topology for any of a variety of different reasons, including loop initialization following a power reset of the node, initialization upon start up of the first node of the arbitrated loop, subsequent inclusion of an FC node into an already operating arbitrated loop, and various error recovery operations. FC arbitrated loop initialization comprises seven distinct phases. FIG. 19 shows a diagram of the seven phases of FC arbitrated loop initialization. FIG. 20 shows the data payload of FC frames transmitted by FC nodes in an arbitrated loop topology during each of the seven phases of loop initialization shown in FIG. 19. The data payload for the FC frames used in each of the different phases of loop initialization comprises three different fields, shown as columns 2002–2004 in FIG. 20. The first field 2002 within each of the different data payload structures is the LI_ID field. The LI_ID field contains a 16-bit code corresponding to one of the seven phases of group initialization. The LI_FL field 2003 for each of the different data payload layouts shown in FIG. 20 contains various flags, including flags that specify whether the final two phases of loop initialization are supported by a particular FC Port. The TL supports all seven phases of loop initialization. Finally, the data portion of the data payload of each of the data payload layouts 2004 contains data fields of varying lengths specific to each of the seven phases of loop initialization. In the following discussion, the seven phases of loop initialization will be described with references to both FIGS. 19 and 20.

In the first phase of loop initialization 1902, called "LISM," a loop initialization master is selected. This first phase of loop initialization follows flooding of the loop with loop initialization primitives ("LIPs"). All active nodes transmit an LISM FC arbitrated loop initialization frame 2006 that includes the transmitting node's 8-byte port name. Each PC Port participating in loop initialization continues to transmit LISM FC arbitrated loop initialization frames and continues to forward any received LISM FC arbitrated loop initialization frames to subsequent FC nodes in the arbitrated loop until either the FC Port detects an FC frame transmitted by another FC Port having a lower combined port address, where a combined port address comprises the D_ID, S_ID, and 8-byte port name, in which case the other FC Port will become the loop initialization master ("LIM"), or until the FC Port receives back an FC arbitrated loop initialization frame that that FC Port originally transmitted, in which case the FC Port becomes the LIM. Thus, in general, the node having the lowest combined address that is participating in the FC arbitrated loop initialization process becomes the LIM. By definition, an FL_PORT will have the lowest combined address and will become LIM. At each of the loop initialization phases, loop initialization may fail for a variety of different reasons, requiring the entire loop initialization process to be restarted.

Once an LIM has been selected, loop initialization proceeds to the LIFA phase 1904, in which any node having a fabric assigned AL_PA can attempt to acquire that AL_PA. The LIM transmits an FC arbitrated loop initialization frame having a data payload formatted according to the data payload layout 2008 in FIG. 20. The data field of this data layout contains a 16-byte AL_PA bit map. The LIM sets the bit within the bit map corresponding to its fabric assigned AL_PA, if the LIM has a fabric assigned AL_PA. As this FC frame circulates through each FC Port within the arbitrated loop, each FC node also sets a bit in the bit map to indicate that FC node's fabric-assigned AL_PA, if that node has a fabric assigned AL_PA. If the data in the bit map has already been set by another FC node in the arbitrated loop, then the FC node must attempt to acquire an AL_PA during one of three subsequent group initialization phases. The fabric assigned AL_PAs provide a means for AL_PAs to be specified by an FC node connected to the arbitrated loop via an FL_Port.

In the LIPA loop initialization phase 1906, the LIM transmits an FC frame containing a data payload formatted according to the data layout 2010 in FIG. 20. The data field contains the AL_PA bit map returned to the LIM during the previous LIPA phase of loop initialization. During the LIPA phase 2010, the LIM and other FC nodes in the arbitrated loop that have not yet acquired an AL_PA may attempt to set bits within the bit map corresponding to a previously acquired AL_PA saved within the memory of the FC nodes. If an FC node receives the LIPA FC frame and detects that the bit within the bit map corresponding to that node's previously acquired AL_PA has not been set, the FC node can set that bit and thereby acquire that AL_PA.

The next two phases of loop initialization, LIHA 1908 and LISA 1910 are analogous to the above-discussed LIPA phase 1906. Both the LIHA phase 1908 and the LISA phase 1910 employ FC frames with data payloads 2012 and 2014 similar to the data layout for the LIPA phase 2010 and LIFA phase 2008. The bit map from the previous phase is recirculated by the LIM in both the LIHA 1908 and LISA 1910 phases, so that any FC Port in the arbitrated loop that has not yet acquired an AL_PA may attempt to acquire either a hard assigned AL_PA contained in the port's memory, or, at last resort, may obtain an arbitrary, or soft, AL_PA not yet acquired by any of the other FC Ports in the arbitrated loop topology. If an FC Port is not able to acquire an AL_PA at the completion of the LISA phase 1910, then that FC Port may not participate in the arbitrated loop. The FC-AL-2 standard contains various provisions to enable a nonparticipating node to attempt to join the arbitrated loop, including restarting the loop initialization process.

In the LIRP phase of loop initialization 1912, the LIM transmits an FC frame containing a data payload having the data layout 2016 in FIG. 20. The data field 2017 of this data layout 2016 contains a 128-byte AL_PA position map. The LIM places the LIM's acquired AL_PA, if the LIM has acquired an AL_PA, into the first AL_PA position within the AL_PA position map, following an AL_PA count byte at byte 0 in the data field 2017, and each successive FC node that receives and retransmits the LIRP FC arbitrated loop initialization frame places that FC node's AL_PA in successive positions within the AL_PA position map. In the final loop initialization phase LILP 1914, the AL_PA position map is recirculated by the LIM through each FC Port in the arbitrated loop topology so that the FC Ports can acquire, and save in memory, the completed AL_PA position map. This AL_PA position map allows each FC Port within the arbitrated loop to determine its position relative to the other FC Ports within the arbitrated loop.

Hardware Implementation of the Fibre Channel Sequence Data Re—Assembly Process

When an FC Port receives a number of FC data frames that contain FC sequence data transferred as part of an FCP write or read operation, where the host containing the FC Port initiates the FCP read operation or is the target of the FCP write operation, the FC Port must extract the data from the data frames and place the data into host memory buffers. The FC Port determines where to place the data by referencing a transaction status block ("TSB") that is allocated, initialized, and passed to the FC Port by the FC host after the host is notified, by the FC Port, of reception of the FCP_CMND frame that begins the FCP transaction. FIG. 21 shows generalized TSBs employed by currently available and previously available FC Ports. Both TSBs 2102 and 2104 contain a number of pointers 2106–2108 and 2110–2112, respectively, to host memory buffers 2114–2116 and 2118–2120, respectively. In first type of FC Port using TSB 2102 shown in FIG. 21, the memory buffers are required by the FC Port to have a length equal to $2^n$ bytes, where n is an integer greater than 0, and, practically, greater than some threshold value like 9. If the host memory buffer exceeds a length of $2^n$, but is less than $2^{n+1}$ bytes in length, then the extra bytes of the host memory buffer are not used. Thus, for example, if the host computer acquired a memory buffer of length 2,000 bytes, 1024 bytes of the memory buffer could be used as a memory buffer of length $2^{10}$ and 976 bytes of the memory would be wasted. In some cases, all of the host memory buffers are required to have the same length, and the memory buffers are commonly required to be aligned in host memory with host memory addresses that are exact multiples of the length of the memory buffers.

In a second type of currently available FC Port that uses the second TSB 2104 shown in FIG. 21, host memory buffers can be of arbitrary length and need only have byte alignment. However, FC data frames must be received in order in FC Ports of this type. In FIG. 21, five successive FC frames 2122–2126 have been received by the FC Port and placed into host memory buffers 2118 and 2119. The data contained in the FC data frames form one logically contiguous sequence of bytes. If, in an FC Port of this second type, the next data frame received is frame 7, then the FC_Port cannot process the received FC data frame, and the host driver must manually reassemble the sequence.

The present invention relates to a hardware implementation, within the TL, of FC data sequence data reassembly into host memory buffers. The layouts of the TSBs employed in the present invention are discussed above with reference to FIGS. 13–14 and 17–18. These figures show the two types of IREs and the two types of TWEs. These IREs and TWEs are TSBs that contain, in part, the information necessary for the hardware implementation of the present invention in the TL to reassemble received FC data sequence data in host memory buffers. Generalized representations of these TSBs and certain data fields related to the present invention contained within these TSBs are shown in FIGS. 22–23.

Figure 22:
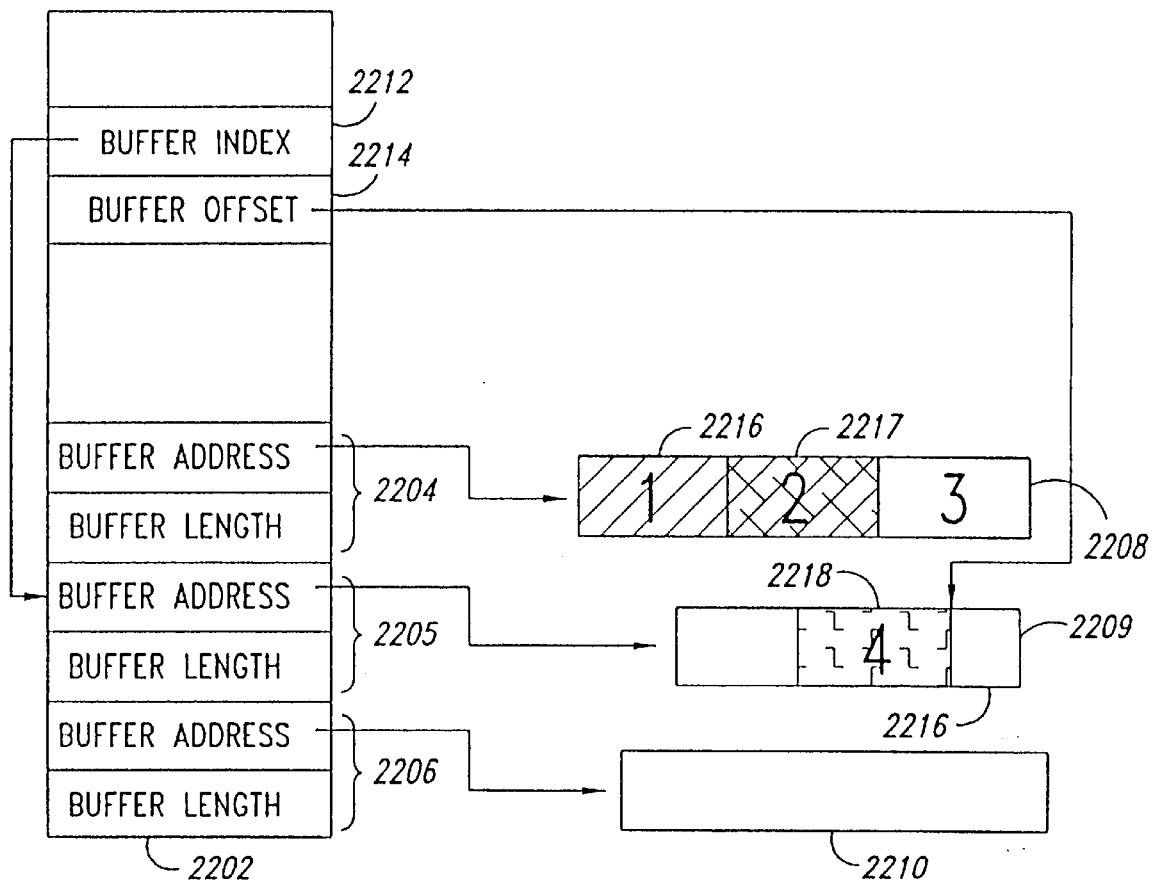
FIG. 22 shows a local TSB.

FIG. 22 shows a local TSB. The local TSB 2202 contains three buffer descriptors 2204–2206 that each includes a buffer address field and a buffer length field. The buffer address fields point to host memory buffers 2208–2210. A buffer index field 2212 points to the buffer descriptor 2205 that includes the next available host memory buffer location into which the next expected FC data frame of an FC data sequence will be placed by the FC Port. The buffer offset field 2214 points to, or indicates, the first available byte 2216 within the host memory buffer 2209 pointed to by the buffer description 2205 pointed to by the buffer index field 2212. In FIG. 22, data frames 1,2, and 4 2216–2218 have been received by the FC Port and placed into the first two host memory buffers 2208 and 2209. Data frame 3 has not yet been received, and so data frame 4 was received out of order. Because of the information contained in the local TSB 2202, the FC Port is able to calculate into which host memory buffer, and at which offset within the host memory buffer, to place the data contained in an out-of-order FC frame. After reception of an out-of-order FC frame, the FC Port updates the buffer index 2212 and buffer offset 2214 fields to indicate the host memory buffer and offset within the host memory buffer in which data contained in the next FC frame will be placed. If, instead of data frame 5, data frame 3 is next received, the FC Port can use the information contained in the local TSB 2202 to determine the appropriate host memory buffer and offset into which to place the data contained in frame 3. Thus, an FC Port that implements the present invention is able to make use of arbitrarily sized host memory buffers 2208–2210 that are byte-aligned to receive and reassemble FC data sequence data contained in FC data frames that are received out of order with respect to the FC data sequence.

Figure 23:
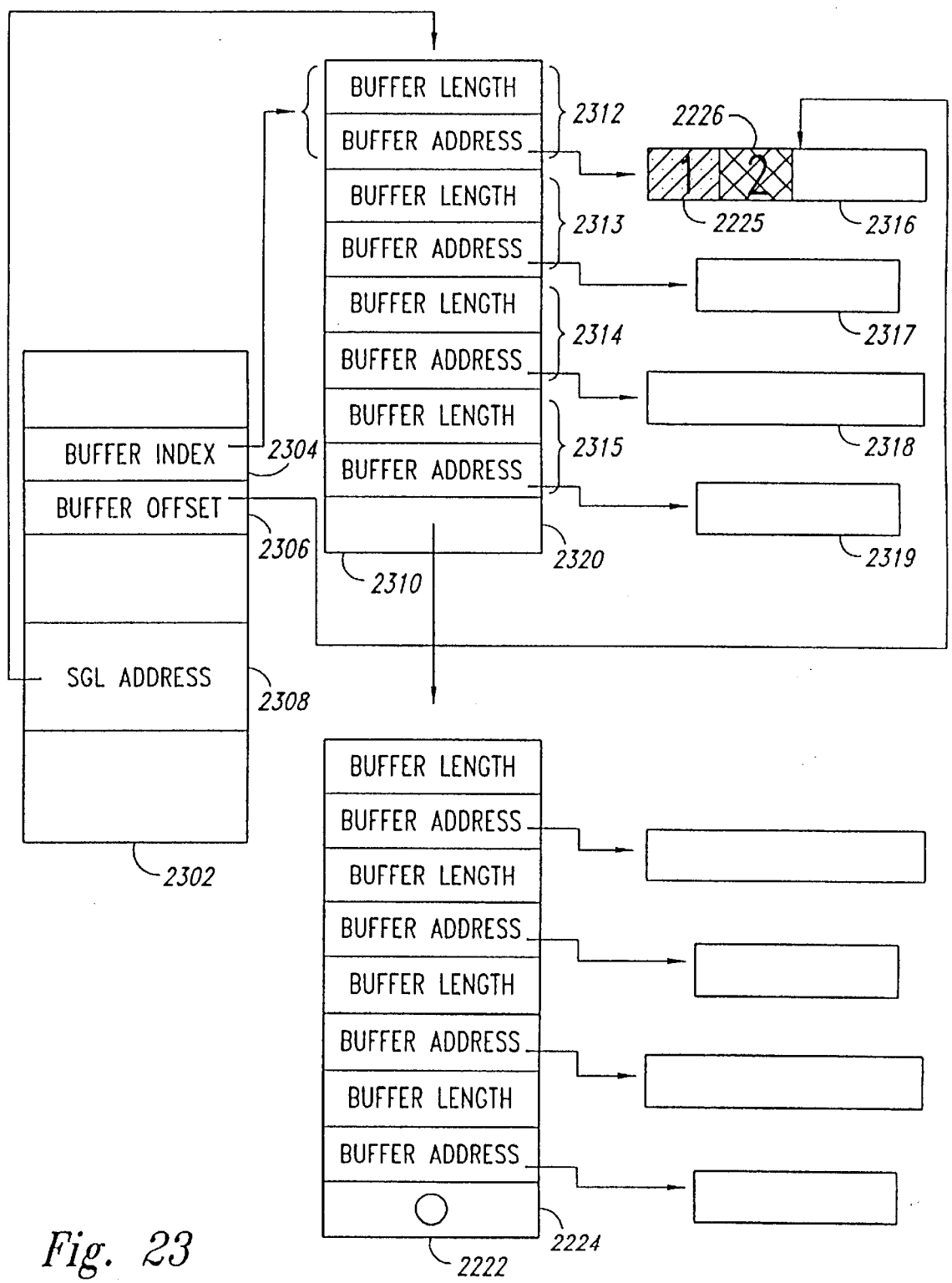
FIG. 23 shows an extended TSB.

FIG. 23 shows an extended TSB used by an FC Port implemented according to the present invention for receiving relatively large FC data sequence data sets that must be placed into four or more host memory buffers. The decision as to whether to use a local TSB or an extended TSB is made by the host computer following notification of reception by the FC Port of an FCP_CMND frame. The decision is made by the host according to the size of the FC sequence data to be received and according to the sizes of host memory buffers that the host computer is able to obtain from the operating system. The extended TSB 2302 also contains a buffer index field 2304 and a buffer offset field 2306, both having the same significance as the data fields of the same names in the local TSB shown in FIG. 22. However, the extended TSB 2302 contains an SGL address block 2308 rather than the buffer descriptors contained in the local TSB (2204–2206 in FIG. 22). The SGL address block contains a pointer to a first SGL node 2310. The SGL node 2310 contains a number of buffer descriptors 2312–2316, each having a buffer length and a buffer address field. As in the local TSB in FIG. 22, the buffer descriptors point to and describe host memory buffers 2316–2319. The final field in an SGL node 2320 contains either a pointer to another SGL node that, in turn, contains additional host memory buffer descriptors, or contains the value 0 to indicate the end of a chain of SGL nodes. The final field 2320 in the first SGL node 2310 of FIG. 23 contains a pointer to a second SGL node 2322. That second SGL node 2322 contains the value 0 in its final field 2224 to indicate the end of the SGL node list. As in the case of the local TSB in FIG. 22, received FC data sequence data is placed, in order, into the host memory buffers starting with the first host memory buffer described by the first buffer descriptor in the first SGL node. Thus, for example, in FIG. 23, the data contained in the first two FC data frames 1 and 2, 2225 and 2226, respectively, have been placed in the first host memory buffer 2316. As in the case of an FC Port using a local TSB, an FC Port using an extended TSB can handle FC data frames received out of order with respect to the FC data sequence in which they are contained, and can make use of arbitrarily-sized byte-aligned host memory buffers. In addition, an FC Port using an extended TSB can receive a very large amount of data and can place that data in a very large number of discrete host memory buffers. Thus, the extended TSB provides greater flexibility to the host computer and to the FC Port for storing FC data sequence data.

Implementation of the Present Invention

In this subsection, a pseudo-code, C++– like implementation is provided to describe a preferred approach to a hardware implementation of the present invention. This pseudo-code implementation is provided for illustrative purposes only. A different, object-oriented development language is employed by TL circuit designers to specify the function of the TL. This specification is then automatically translated into circuitry within the TL. Thus, a pseudo-code description of the hardware implementation is a reasonable and intuitive way in which to describe the hardware implementation. Obviously, there are many possible variations in the pseudo-code implementation to be presented in this subsection, and many additional details, including error conditions, that must be handled during loop operation by the TL. However, the following pseudo-code implementation well-describes and characterizes the method and system of the present invention.

Figure 24A:
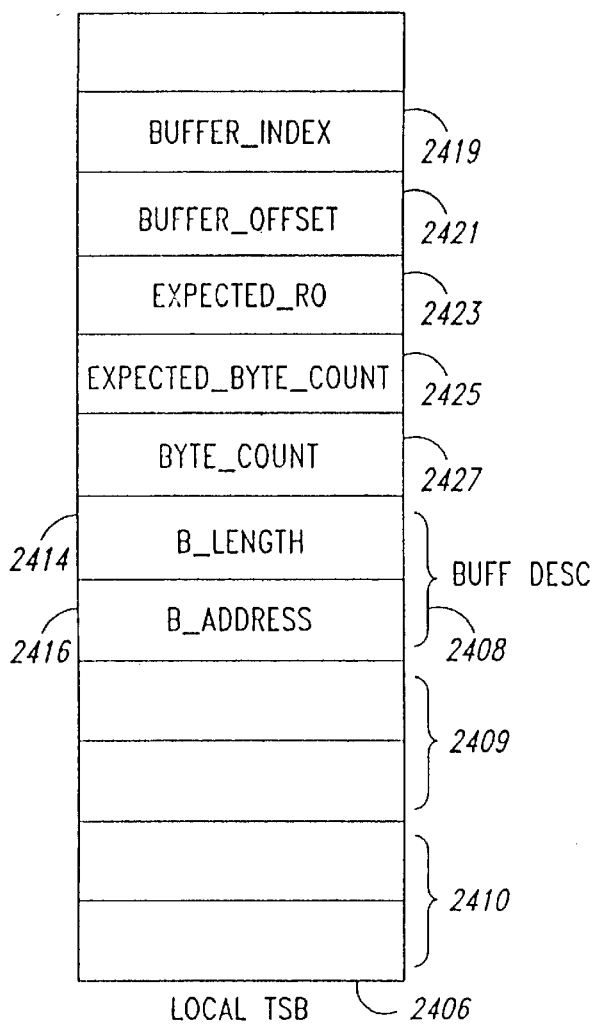
FIGS. 24A–24B show generalized data structures and data structure field values used in a pseudo-code implementation of the present invention.
Figure 24B:
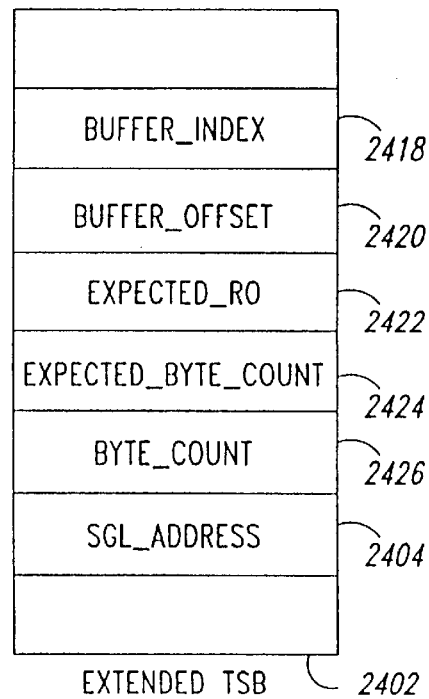
Figure 24C:
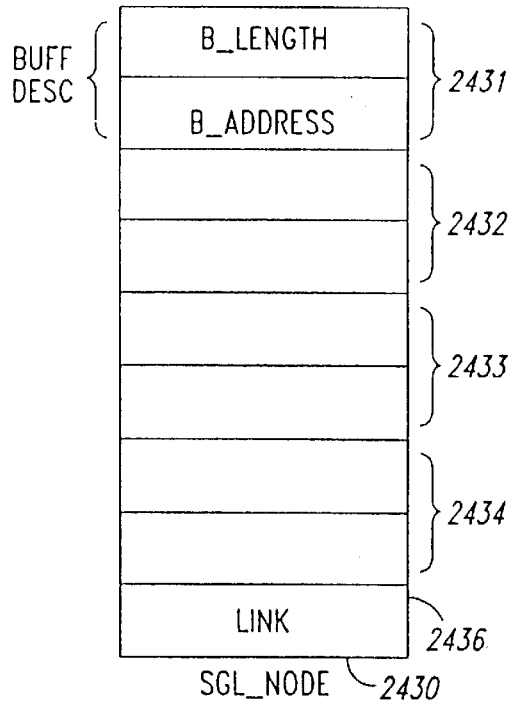

FIGS. 24A–24C show the generalized data structures and data structure field names used in the pseudo-code implementation of the present invention, below. As discussed above, there are two different types of TSBs: (1) an extendedTSB 2402, that employs a pointer called "SGL_address" 2404 to a list of SGL_nodes, that store buffer descriptors; and (2) a localTSB 2406 that includes space for three buffer descriptors 2408–2410 at the end of the localTSB. Within a buffer descriptor, called "buffDesc" in the pseudo-code implementation, there is a length field 2414, called "b_length," that stores the length of a host memory buffer, and an address field 2416, called "b_address," that stores the address of a host memory buffer. Both types of TSBs 2402 and 2406 contain the fields "buffer_index" and "buffer_offset" 2418–2421, as discussed above with reference to FIGS. 22–23. In addition, both types of TSBs 2402 and 2406 also contain the fields "expected_RO," "expected_byte_count," and "byte_count" 2422–2427. The field "expected_RO" contains the relative offset that is expected to be included in the next FC data frame to be received in an FC data sequence. The field "expected_byte_count" contains the total number of data bytes expected to be received for an FC sequence. The field "byte_count" contains the number of data bytes of an FC sequence already received, incremented upon reception of each FC data frame of the FC data sequence. FIG. 24C shows an SGL_node 2430 that contains a number of buffer descriptors 2431–2434 and a length field 2436 that either contains the value 0 to indicate that the SGL_node is the last SGL_node in a length list of SGL_nodes or contains a pointer to the next SGL_node of a linked list of SGL_nodes.

The following four class declarations and type declarations define four classes and a type that will be used in the subsequent pseudo-code implementation of a preferred embodiment of the present invention. Implementations of the function members of these four classes will not be given, since their implementation is both straightforward and is dependent, to some degree, on the type of hardware environment in which they are implemented. In general, in the following pseudo-code, only member functions that encapsulate functionality related to the present invention will be implemented.

The class "DMA_engine," declared above on lines 1–4, represents hardware DMA functionality, and the single member function "DMA" is called by a hardware implementation of the present invention to transfer data bytes from an FC data frame into host memory buffers. The first argument of the member function "DMA" is a pointer to the first byte of data in an FC data frame, the second argument is the length of the data within the FC data frame, the third argument is a pointer to the buffer description that describes the host memory buffer into which the data will be transferred, and the fourth argument is an offset within the host memory buffer that marks the starting point within the host memory buffer for the data transfer. The class "DMAerror," declared above on lines 6–9, represents a generalized error reporting system within the following pseudo-code implementation. The single member function "setError" is called by the hardware implementation of the present invention to indicate that an error condition has occurred. In a more detailed pseudo-code implementation, specific error codes might be passed in one or more arguments to the member function "setError." Alternatively, error conditions might be immediately signaled at the point where they occur. The details or error handling in the hardware implementation are beyond the scope of the current application. The class "buffDesc," declared above on lines 11–18, represents a buffer descriptor within a local TSB (eg, buffDesc 2408 in FIG. 24A) or a buffer descriptor in an SGL_node (eg, buffDesc 2431 in FIG. 24C). The member function "getLength," declared on line 16, returns the length of the host memory buffer described by an instance of buffDesc, and the memory function "getAddress," declared above on line 17, returns the address of the first byte of the host memory data buffer described by an instance of buffDesc. The class "SGL_node," declared above on lines 20–25, represents an SGL_node, such as SGL_node 2430 in FIG. 24C. The class "SGL_node" contains three member functions: (1) "getFirstBuffDesc," declared above on line 22, that returns a pointer to the first buffer descriptor in the SGL_node; (2) "getNextBuffDesc," a member function that takes a pointer to a buffer descriptor

```
1   class DMA_engine
2   {
3       Boolean DMA(unsigned char* data, int length, buffDesc *x, int offset);
4   }
5
6   class DMA error
7   {
8       void setError ( );
9   }
10
11  class buffDesc
12  {
13      int   b_length;
14      int   b_address;
15
16      int              getLength( );
17      unsigned char*   getAddress( );
18  }
19
20  class SGL_node
21  {
22      buffDesc*       getFirstBuffDesc( );
23      buffDesc*       getNextBuffDesc(buffDesc* current);
24      SGL_node*
25  }
26
27  type SGL_node*  SGL_pointer;
``` within the instance of the SGL_node and returns a pointer to the next buffer descriptor following that buffer descriptor in the SGL_node, or the value NULL when the buffer descriptor pointed to by the argument "current" is the final buffer descriptor in the SGL_node; and (3) "getNextSGLnode," declared above on line 24, that returns the pointer to the next SGL_node in a linked list of SGL_nodes, or the value NULL if the SGL_node instance is the final SGL_node in a linked list of SGL_nodes. The type declaration SGL_pointer, declared above on line 77, declares SGL_pointer to be the type "pointer to an SGL_node."

The following three class declarations are class declarations for a generalized TSB and for the extendedTSB (2402 in FIG. 24A) and the localTSB (2406 in FIG. 24A) that are derived from, and inherit the characteristics of, the generalized TSB class declaration. Again, implementation of a majority of the member functions of these classes is straightforward, and is not provided below.

node that contains the buffDesc pointer returned by member function "getBufferNext," in the case of an extendedTSB. In the case of a localTSB, member function "getBufferNext" ignores argument "SGL." Likewise, the member function "setBufferNext," declared above on line 10, sets the data member "buffer_index" to the value specificied by the argument "next," with argument "sgl" pointing to the SGL_node, if any, that contains the buffDesc pointed to by argument "next." The remaining "get" and "set" member functions, declared above on lines 11–17, are straightforward.

The final two member functions of class "TSB," declared above on lines 18–19, implement, in part, the present invention, and implementations of these member functions are therefore provided later in the pseudo-code implementation. The virtual member function "getBuffer," declared above on line 18, takes as arguments an FC relative offset, and reference arguments "internalOffset" and "SGL." The member function"getbuffer" sets these latter two reference

```
1   class TSB
2   {
3        buffDesc*      buffer_index;
4        int            buffer_offset;
5        int            expected_RO;
6        int            byte_count;
7        int            expected_byte_count;
8
9        buffDesc*      getBufferNext(SGL_pointer & sgl);
10       void           setBufferNext(buffDesc* next, SGL_pointer sgl);
11       int            getBufferOffset( );
12       void           setBufferOffset(int offset);
13       int            getExpectedRelativeOffset( )
14       void           setExpectedRelativeOffset(int ro);
15       int            getByte_count( );
16       void           setByte_count(int bc);
17       int            getExpected_byte_count( );
18       virtual buffDesc*   getBuffer(int relOffset, int & internalOffset,
19                                     GL_pointer & sgl);
20       virtual buffDesc*   getNextBuffer(SGL_pointer & sgl, buffDexc* x);
21  }
22
23
24  class extendedTSB:TSB
25  {
26       SGL_node*      SGL_address;
27
28       buffDesc*      getBuffer(int relOffset, int & internalOffset, SGL_pointer & sgl);
29       buffDesc*      getNextBuffer(SGL_ponter & sgl, buffDesc* x);
30  }
31
32  class localTSB:TSB
33  {
34       buffDesc*      getFirstBuffer( );
35       int            getNumBuffers( );
36       buffDesc*      getBuff(int relOffset, int & internalOffset, SGL_pointer & sgl);
37       buffDesc*      getNextBuffer(SGL_pointer & sgl, buffDesc* x);
38  }
```

Class "TSB," declared above on lines 1–20, represents a generalized TSB. The data members, declared above on lines 3–7, correspond to the TSB fields that are common both to extendedTSBs and localTSBs (2418–2427 in FIGS. 24A–24B). The "get" and "set" member functions, declared above on lines 9–17, fetch and set the values in these data members, respectively. For example, the member function "getBufferNext," declared above on line 9, fetches the buffDesc pointer from the member "buffer_index," declared above on line 3. The argument "SGL" of member function "getBufferNext" is passed by reference so that member function "getBufferNext" can set SGL to point to the SGL_ arguments to an internal offset within a host memory buffer and to the SGL_node containing the returned buffer descriptor, respectively. The member function "getbuffer" returns a pointer to the buffer descriptor, and an internal offset within the buffer descriptor via reference argument "internalOffset," that corresponds to an FC relative offset. If the instance of the TSB is an extended TSB, then member function "getbuffer" also returns via argument "SGL," a pointer to the SGL node that contains the returned pointer to a buffer descriptor. This member function is called following the receipt of an out-of-order frame, and searches through the host memory buffers described by the TSB, starting with the first memory buffer, until the appropriate memory buffer and the offset within the memory buffer that correspond to the relative offset furnished in argument "reOffset" are found. The member function "getbuffer" returns NULL if the supplied relative offset is not contained within the host memory buffers referenced by an instance of a TSB. The virtual member function "getNextBuffer," declared above on line 19, takes a pointer to a buffer descriptor and a pointer to an SGL_node, if any, and returns the pointer to the next buffer descriptor described by an instance of a TSB. This function returns NULL if there is no next buffer.

The class "extendedTSB," declared above on lines 22–28, derives form class "TSB" and implements an extendedTSB (2402 in FIG. 24B). The extendedTSB includes the data member "SGL_address" (2404 in FIG. 24B), declared on line 24. The class "localTSB," declared above on lines 30–36, implements a localTSB (2406 in FIG. 24A). The class "localTSB" includes member functions: (1) "getFirstBuffer," that returns a pointer to the first buffer descriptor (2408 in FIG. 24A) in the instance of a localTSB; and (2) "getNumBuffers," a member function that returns the total number of buffer descriptors available in the TSB. Both derived classes "extendedTSB" and "localTSB" implement the virtual member functions "getBuffer" and "getNextBuffer."

Implementations of the member functions "getBuffer" and "getNextBuffer" for the class "extendedTSB" are provided below.

Member function "getbuffer" contains three local variables declared on lines 4–6: (1) "rem," the remaining number of bytes to be traversed in order to arrive at the relative offset within a host memory buffer; (2) "rem_minus," the remaining number of bytes to be traversed following consideration of the current buffer descriptor; and (3) "x," a pointer to the buffer descriptor to be returned by the function "getBuffer." On line 8, getBuffer sets the reference argument "sgl" to a pointer to the first SGL_node referenced by the instance of the extended TSB. If, as a result of this operation, sgl has the value NULL, as determined by getBuffer on line 9, then getbuffer returns the value NULL, indicating that the relative offset supplied in argument "relOffset" is not contained within the aggregate host memory buffers referenced by the instance of the class "extendedTSB". Next, on line 10, getbuffer sets local variable "x" to point to the first buffer descriptor in the first SGL_node. If "x" is NULL, determined by getbuffer on line 11, then getbuffer returns the value NULL. Otherwise, getbuffer sets the local variable "rem" to the relative offset supplied in argument "relOffset" on line 12. Then, on line 13, getbuffer sets the local variable "rem_minus" to rem minus the length of the buffer described by the buffer descriptor pointed to by the local variable "x." Then, getBuffer iteratively considers each buffer referenced by the instance of the extended TSB class in the while-loop on lines 14–26 until the value in rem_minus is equal to, or less than 0. When the value stored in rem_minus is equal to or less than 0, local variable "x"

```
1   buffDesc*   extendedTSB::getBuffer(int relOffset, int & internalOffset,
2                               SGL_pointer & sgl)
3   {
4       int         rem;
5       int         rem_minus;
6       buffDesc*   x;
7
8       sgl = SGL_address;
9       if (sgl == NULL) return NULL;
10      x = sgl->getFirstBuffDesc( );
11      if (x == NULL) return NULL;
12      rem = relOffset;
13      rem_minus = rem – x ->getLength( );
14      whil (rem_minus > 0)
15      {
16          rem = rem_minus;
17          x = sgl->getNextBuffDesc(x);
18          if (x == NULL)
19          {
20              sgl = sgl->getNextSGLnode( );
21              if (sgl == NULL) return NULL;
22              x = sgl->getFirstBuffDesc( );
23              if (x == NULL) return NULL;
24          }
25          rem_minus = rem_minus – x->getLength( );
26      }
27      internalOffset = rem;
28      return x;
29  }
30
31  buffDesc*   extendedTSB::getNextBuffer(SGL_pointer & sgl, buffDesc* x)
32  {
33      x = sgl->getNextBuffDesc(x);
34      if (x == NULL)
35      {
36          sgl = sgl->getNextSGLnode( );
37          if (sgl == NULL) return NULL;
38          x = sgl->getFirstBuffDesc( );
39          if (x == NULL) return NULL;
40          return x;
41      }
42  }
``` points to a buffer descriptor describing the host memory buffer in which the relative offset occurs. On line 16, getBuffer sets rem to the current value of rem_minus. This initializes rem for the next iteration of the while-loop. Next, getBuffer sets "x" to the next buffer in the SGL_node pointed to by sgl. If "x" is set to the value NULL, because no further buffer descriptors occur in the SGL_node pointed to by sgl, then, on line 20, getBuffer sets sgl to the next SGL_node in the list of SGL_nodes referenced by the instance of the class "extendedTSB". If there are no further SGL_nodes in the linked list of SGL_nodes, then getBuffer returns NULL on line 21. Next, on line 22, getBuffer sets "x" to the first buffer descriptor within the SGL_node pointed to by sgl. If "x" now has the value NULL, then getBuffer returns the value NULL on line 23. On line 25, getBuffer sets rem_minus to the value contained in rem_minus minus the length of the host memory buffer described by the buffer descriptor pointed to by local variable "x." The while-loop continues to iterate until the value contained in rem_minus falls below 1. At that point, getBuffer sets the reference argument "internalOffset" to the value contained in rem, now the offset within the host memory buffer described by the buffer descriptor pointed to by local variable "x," and returns the buffer descriptor pointer "x" on line 28.

The extended TSB member function "getNextBuffer," declared above on lines 31–42, returns the pointer to the next buffer descriptor in the sequence of buffer descriptors following the buffer descriptor pointed to by argument "x." The reference argument "sgl" is set by getNextBuffer to point to the SGL_node that contains the returned buffer descriptor pointer. If there are no further buffer descriptors in the sequence of buffer descriptors referenced by the instance of the class "extendedTSB", then getNextBuffer returns the value NULL. First, getNextBuffer sets "x" to the value returned by the SGL_node member function "getNextBuffDesc" on line 33. If the returned value is NULL, then getNextBuffer attempts to set sgl to point to the next SGL_node in the length list of SGL_nodes referenced by the instance of the class "extendedTSB". If there is no further SGL_node, then getNextBuffer returns NULL on line 37. Otherwise, getNextBuffer sets "x" to a pointer to the first buffer descriptor within the new SGL_node pointed to by SGL. If "x" is assigned the value NULL, then getNextBuffer returns NULL on line 39. Otherwise, getNextBuffer returns the buffer descriptor pointer contained in "x" on line 40.

Implementations of the local TSB member functions "getBuffer" and "getNextBuffer" are provided below.

```
1   buffDesc*  localTSB::getBuffer(int relOffset, int & internalOffset,
2                                  SGL_pointer & sgl)
3   {
4       int       j = getNumBuffers( );
5       int       rem;
6       int       rem_minus;
7       buffDesc* x;
8
9   x = getFirstBuffer( );
10  rem = relOffset;
11  rem_minus = rem - x->getLength( );
12  while (rem_minus > 0 && j > 0)
13  {
14          rem = rem_minus;
15          x = x + 1;
16          if (x->getAddress( ) == NULL) return NULL;
17          rem_minus = rem_minus - x->getLength( );
18          j--;
19      }
20      if (j == 0) return NULL;
21      internalOffset = rem;
22      return x;
23  }
24
25  buffDesc*  local TSB::getNextBuffer(SGL_pointer & sgl, buffDesc* x)
26  {
27      if (x == getFirstBuffer( ) + getNumBuffers( ) - 1)
28          return NULL;
29      else return ++x;
```

Member function "getBuffer," declared above on lines 1–23, includes the local variables "j," an iteration variable initialized to the total number of buffer descriptors contained in the instance of the class "localTSB"; and the following local variables identical in function to the identically named local variables of the extendedTSB member function "getBuffer," discussed above: (1) "rem;" (2) "rem_minus;" and (3) "x." On line 9, get buffer sets local variable "x" to point to the first buffer descriptor in the instance of the class "localTSB.". On lines 10–11, getBuffer sets rem to the relative offset supplied as argument "relOffset" and sets rem_minus to the relative offset minus the length of the host memory buffer described by the buffer descriptor pointed to by local variable "x." The while-loop composed of lines 12–18 is then iterated by getBuffer until either the value contained in rem_minus falls below 1, or until there are no more buffer descriptors within the instance of the local TSB class to consider. During each iteration of the while-loop, getBuffer sets rem to the value contained in rem_minus, on line 14, increments "x" to point to the next buffer descriptor in the instance of the local TSB class on line 15, and determines on line 16 if "x" now contains the value NULL. If "x" does contain the value NULL, then getBuffer returns the value NULL on line 16. Otherwise, getBuffer updates rem_minus by subtracting from the value contained in rem_minus the length of the host memory buffer described by the buffer descriptor pointed to by variable "x." Then, getBuffer decrements the local variable "j." When the while-loop finishes iterating, getBuffer checks the value contained in local variable "j" for the value 0 on line 19. If "j" does not contain the value 0, then the relative offset cannot be located within the host memory buffers referenced by the instance of the class "localTSB", and getBuffer therefore returns the value NULL on line 20. Otherwise, getBuffer sets the reference argument "internalOffset" to the value contained in rem and returns the buffer descriptor pointer contained in the local variable "x," on line 22. The localTSB member function "getNextBuffer," declared above on lines 24–29, simply returns the pointer to the next buffer descriptor in the instance of the class "localTSB," or the value NULL if there are no more buffer descriptors.

Finally, an implementation of a function "DMA_data" is provided below.

```
1   DMA_engine D;
2
3   Boolean DMA_data (int relativeOffset, unsigned char * data, int length,
4                     TSB *tsb, Boolean & complete, DMAerror & error)
5   {
6       Boolean         res = TRUE;
7       int             internalOffset;
8       SGL_pointer     sgl;
9       buffDesc*       x;
10      int             rem;
11      int             rem_buffer;
12      int             DMAlength;
13
14      complete = FALSE;
15      if (relative Offset != tsb->getExpectedRelativeOffset( ))
16      {
17          res = FALSE;
18          x = tsb->getBuffer(relativeOffset, internalOffset, sgl);
19      }
20      else
21      {
22          x = tsb->getBufferNext(sgl);
23          internalOffset = tsb->getBufferOffset( );
24      }
25      if (x == NULL)
26      {
27          error.setError ( );
28          return res;
29      }
30      rem = length;
31      rem_buffer = x->getLength( ) – internalOffset;
32      while (rem > 0)
33      {
34          if (rem <= rem_buffer) DMAlength = rem;
35          else DMAlength = rem_buffer;
36          if (!D.DMA(dat, DMAlength, x, internalOffset))
37          {
38              error.setError( );
39              return res;
40          }
41          if (rem <= rem_buffer)
42          {
43              tsb->setExpectedRelativeOffset(relativeOffset + length);
44              tsb->setByte_count(tsb->getByte_count( ) + length);
45              if (tsb->getExpected_byte_count( ) == tsb->getByte_count( ))
46                  complete = TRUE;
47              if(!complete)
48              {
49                  if (rem > rem_buffer)
50                  {
51                      tsb->setBufferOffset(internalOffset + rem);
52                      tsb->setBufferNext(x, sgl);
53                  }
54                  else
55                  {
56                      x = tsb->getNextBuffer(sgl, x);
57                      tsb-> setBufferOffset(0);
58                      tsb->setBufferNext(x, sgl);
59                  }
60              }
61              rem = 0;
62          }
63          else
64          {
65              rem = rem – DMAlength;
66              x = tsb->getNextBuffer(sgl, x);
67              if (x == NULL)
68              {
69                  error.setError( );
```

```
70              return res;
71          }
72          internalOffset = 0;
73          rem_buffer = x->getLength( );
74      }
75   }
76   return res;
77 }
```

Hardware circuitry from the TL implements this function in order to move data from FC data frames into the correct position within a series of host memory buffers allocated by the host computer to receive FC data sequence data. Arguments for the function "DMA_data" include (1) "relativeOffset," the relative offset of the data within the received FC data frame with respect to the FC data sequence in which the FC data frame is included; (2) "data," a pointer to the first byte of data within the received FC data frame; (3) "length," the length of the data in the received FC data frame; (4) "TSB," a pointer to the TSB that describes the FCP transaction but includes the FC data sequence to which the received FC data frame belongs; (5) "complete," a Boolean reference argument that DMA_data sets to TRUE when the last FC data frame has been received; and (6) "error," a reference argument for reporting errors detected by DMA_data. The global variable "D," declared on line 1, is an instance of a DMA_engine that the function "DMA_data" uses to transfer data from a received FC data frame to a host memory buffer.

The function "DMA_data" uses seven local variables, declared above on lines 6–12: (1) "res," a Boolean variable that contains the value returned by DMA_data to indicate whether or not the received FC data frame was received in FC data sequence order; (2) "interalOffset," a pointer to an offset within a host memory buffer corresponding to the relative offset of the received FC data frame data within the FC sequence; (3) "sgl," an SGL_pointer; (4) "x," a buffer description pointer; (5) "rem," the remaining number of bytes prior to the first byte corresponding to the position in the FC sequence of the data received in the FC data frame; (6) "rem_buffer," the remaining bytes in the current buffer being considered; and (7) "DMAlength," the number of bytes to transfer in a single call to the DMA_engine member function "DMA." On line 14, DMA_data initializes the reference argument "complete" to FALSE. Next, on line 15, DMA_data compares the relative offset supplied in argument "RelativeOffset" to the expected relative offset that would be contained in the next in-order FCP data frame. If the relative offset is not equal to the expected relative offset, then the received FC data frame has been received out-of-order with respect to the FC sequence. In that case, DMA_data sets the return value to FALSE, on line 17, and calls the member function "getbuffer" of the TSB pointed to by the argument "TSB" to retrieve the pointer to the buffer descriptor, and an offset within the host memory buffer described by that buffer descriptor, in which to place the data of the received FC data frame. Otherwise, on lines 22–23, DMA_data acquires the buffer descriptor and buffer offset by calling the TSB member functions "getBufferNext" and "getBufferOffset." The latter case, implemented by lines 20–24, is the case in which the received FC data frame has been received in-order, and the member functions called on lines 22–23 to retrieve values stored data fields of the TSB. If the value of the buffer descriptor pointer "x" is NULL, as detected by DMA_data on line 25, an error has resulted and DMA_data marks that error on line 27 and returns on line 28. Otherwise, on line 30, DMA_data sets rem to be the length of the data in the received FC data frame and initializes rem_buffer to be the usable space within the host memory buffer described by the buffer descriptor pointed to by local variable "x." In the while-loop composed of lines 32–75, DMA_data transfers the data in the received FC data frame into one or more host memory buffers. If the received data is larger in size than the remaining available space within the first host memory buffer, then DMA_data transfers a portion of the received data into the current host memory buffer and chooses the next host memory buffer into which the remaining data of the received FC data is transferred. The while-loop continues to iterate until all of the data received in the FC data frame has been transferred to host memory buffers.

On lines 34–35, DMA_data sets DMAlength to be the length of data to transfer in the next DMA operation. If the remaining data to be transferred is less than or equal to the available space in the currently considered host memory buffer, then DMAlength is set to the value contained in rem on line 34. Otherwise, DMAlength is set by DMA_data to the number of bytes remaining in the buffer on line 35. On lines 36–49, DMA_data calls the DMA engine member function "DMA" to transfer data to the currently considered host memory buffer. If the DMA transfer fails, then DMA_data marks the error and returns on line 38–39. If the data transferred in the DMA operation completes the transfer of data from the received FC data frame to host memory buffers, as detected by DMA_data on line 41, then DMA_data executes lines 43–62 to complete transfer of the FC data frame to host memory, finally setting the value of rem to 0 on line 62 that causes termination of the while-loop of lines 32–75 and subsequent termination of DMA_data. To complete the FC data transfer, DMA_data sets the expected relative offset of the TSB to the relative offset expected for next FC data frame, on line 43. DMA_data then, on line 44, updates the byte count representing the number of bytes of the FC sequence that has been received and compares, on line 45, the updated byte count to the expected byte count. If the updated byte count equals the expected byte count, then the entire FC data sequence data has been received and DMA_data sets the reference argument "complete" to TRUE on line 46. If transfer of the entire FC sequence data is not completed, as determined by DMA_data one line 47, then DMA_data, on lines 49–59, updates the buffer_index and buffer_offset fields of the TSB pointed to by argument "TSB." Otherwise, if the data received in the FC data frame is larger than the space remaining in the currently considered host memory buffer, DMA_data executes lines 65–73 to prepare for iteration of the while-loop of lines 32–75 in which the next portion of the received data is transferred to another host memory buffer. On line 65, DMA_data updates rem by subtracting from rem the length of data just transferred in the previous DMA operation. Then, on line 66, DMA_data sets "x" to point to the next buffer descriptor referenced by the TSB pointed to by argument "TSB." If there is no next buffer descriptor, as detected by DMA_data on line 67, then DMA_data marks an error and returns on lines 69–70. Otherwise, DMA_data updates the variable "internalOffset" and "rem_buffer" to prepare for the next iteration of the while-loop composed of lines 32–75. When the while-loop terminates, DMA_data returns the Boolean value contained in the variable "res" on line 76.

Although the present invention has been described in terms of a particular embodiment, it is not intended that the invention be limited to this embodiment. Modifications within the spirit of the invention will be apparent to those skilled in the art. For example, the present invention may be specified using many different types of specification languages in an almost limitless number of ways. The data structures employed by the present invention may be differently organized and may contain different data fields.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. An interface controller that operates together with a communications network host to implement a number of network communications protocol layers, the interface controller coupled to a receiver that is, in turn, coupled to a communications network transport medium through which the receiver receives a data sequence, the data sequence composed of a number of data frames that contain data, the interface controller comprising:

a direct memory access engine for transferring data from a received data frame to a host memory buffer;

a transaction status block allocated within host memory and initialized by the host to represent a data sequence, the transaction status block containing information fields and referencing a number of arbitrarily-sized and byte-aligned host memory buffers; and a logic component that assembles data, received in data frames, in host memory, sequentially ordering the data according to an order specified by the data sequence, processing each data frame received by the receiver, both in the case that the data frame is received in-order with respect to the data sequence and in the case that the data frame is received out-of-order with respect to the data sequence, by directing the direct memory access engine to transfer one or more data blocks from the received data frame into one or more locations within one or more host memory buffers, the number of data block transfers depending on the relative sizes of the data to be transferred and the available space remaining in the host memory buffer to which the data is transferred, the logic component determining a host memory buffer and location within the host memory buffer into which to transfer a data block by using the information fields and host memory buffer references contained in the transaction status block.

2. The interface controller of claim 1 wherein the transaction status block contains an expected relative offset information field and each data frame includes an indication of the relative offset of the data contained in the data frame with respect to the data sequence, wherein the expected relative offset information field indicates the relative offset that should be included in the sequential next data frame of the data sequence, and wherein the interface controller determines, by comparing the relative offset included in a received data frame to the expected relative offset information field, whether the received data fame was received in order with respect to the data sequence.

3. The interface controller of claim 2 wherein the transaction status block contains buffer index and buffer offset information fields and wherein the interface controller, upon determining that a received data frame has been received in order with respect to the data sequence, determines a host memory buffer into which to transfer a first block of data from the received data frame from a value contained in the buffer index information field and determines the location within the determined host memory buffer into which to transfer a first block of data from the received data frame from a value contained in the buffer offset information field.

4. The interface controller of claim 3 used to implement a Fibre Channel port, wherein the data sequence is a Fibre Channel sequence composed of a number of Fibre Channel data frames.

5. The interface controller of claim 4 wherein the transaction status block contains data fields containing references to host memory buffers.

6. The interface controller of claim 4 wherein the transaction status block may contain a data field containing a reference to a linked list of auxiliary blocks that each contain references to host memory buffers.

7. A method for placing data in a received data frame of a data sequence by an interface controller, operating in a network communication port that interfaces a communications network with a host, into a position within host memory specified by the data sequence according to a network communications protocol so that the interface controller assembles data received in all data frames of a data sequence sequentially within one or more host memory buffers allocated by the host, the method comprising:

receiving from the received data frame an indication of the relative offset of the data contained in the received data frame with respect to the data sequence;

comparing the received indication of the relative offset of the data contained in the received data frame to an expected relative offset to determine whether the received data frame has been received in-order with respect to the data sequence;

when the received data frame has been received in-order with respect to the data sequence, using a stored indication of a host memory buffer and a stored indication of an offset within the host memory buffer to calculate a size of a first data block to transfer from the received data frame to the host memory buffer, and transferring the first data block from the received data frame to the host memory buffer starting at the indicated offset within the indicated host memory buffer; and when the received data frame has not been received in-order with respect to the data sequence, determining a size of a first data block in the received data frame, a host memory buffer, and an offset within the host memory buffer into which to transfer the first data block in the received data frame to the host memory buffer by examining stored references to successive host memory buffers, and transferring the first data block from the received data frame to the determined host memory buffer starting at the determined offset within the determined host memory buffer.

8. The method of claim 7 further including:

after transferring the first data block, repeatedly determining whether there is an additional next data block within the received data frame that needs to be transferred to a host memory buffer; and if there is an additional next data block within the received data frame that needs to be transferred to a host memory buffer, determining a size of the next data block, a next host memory buffer, and a next offset within the next host memory buffer into which to transfer the next data block by examining a stored reference to a first host memory buffer reference containing available memory, and transferring the next data block from the received data frame to the determined the next host memory starting at the determined next offset within the determined next host memory buffer;

until there is no additional next data block within the received data frame that needs to be transferred to a host memory buffer.

9. The method of claim 8 wherein the interface controller is used to implement within a Fibre Channel port.

10. The method of claim 9 wherein the interface controller is used to implement a Fibre Channel port within a Fibre Channel arbitrated loop topology.

11. The method of claim 10 wherein determining a size of a first data block in the received data frame, a host memory buffer, and an offset within the host memory buffer into which to transfer the first data block in the received data frame to the host memory buffer by examining stored references to successive host memory buffers further includes:

examining references stored in transaction status block allocated and intialized by the host.

12. The method of claim 10 wherein determining a size of a first data block in the received data frame, a host memory buffer, and an offset within the host memory buffer into which to transfer the first data block in the received data frame to the host memory buffer by examining stored references to successive host memory buffers further includes:

examining references stored in a linked list of auxiliary data structures referenced from a transaction status block, the linked list of auxiliary data structures and the transaction status block allocated and initialized by the host.

13. The method of claim 10 wherein determining a size of the next data block, a next host memory buffer, and a next offset within the next host memory buffer into which to transfer the next data block by examining a stored reference to a first host memory buffer reference containing available memory further includes:

examining a reference to a first host memory buffer reference containing available memory stored in transaction status block allocated and intialized by the host.

14. The method of claim 10 wherein determining a size of the next data block, a next host memory buffer, and a next offset within the next host memory buffer into which to transfer the next data block by examining a stored reference to a first host memory buffer reference containing available memory further includes:

examining a reference to a first host memory buffer reference containing available memory stored in a linked list of auxiliary data structures referenced from a transaction status block, the linked list of auxiliary data structures and the transaction status block allocated and initialized by the host.

15. A fibre channel interface controller included within a fibre channel port that operates together with a host as a fibre channel node, the fibre channel interface controller including:

an inbound buffer in which received fibre channel data frames are buffered;

a transaction status block allocated within host memory and initialized by the host to represent a data sequence composed of sequentially ordered data included in a set of sequentially ordered fibre channel data frames, the transaction status block containing information fields and referencing a number of arbitrarily-sized and byte-aligned host memory buffers that together define a logical sequence of host memory positions into which the fibre channel interface controller transfers the sequentially ordered data of the data sequence;

a memory transfer engine that transfers data from a fibre channel frame stored in the inbound buffer to a position within the logical sequence of host memory positions; and a logic circuit that determines, based on information contained in a received data frame and information contained in the transaction status block, a position within the logical sequence of host memory positions to which to direct the memory transfer engine to transfer data in the received data frame so that the data is placed in a position in the logical sequence of host memory positions corresponding to the position of the data within the data sequence.

16. The interface controller of claim 15 wherein the transaction status block contains an expected relative offset information field and each data frame includes an indication of the relative offset of the data contained in the data frame with respect to the data sequence.

* * * * *